(12) United States Patent
Mizuno et al.

(10) Patent No.: US 11,209,889 B2
(45) Date of Patent: Dec. 28, 2021

(54) ENERGY SAVING DEVICE MANAGEMENT METHOD AND ENERGY SAVING DEVICE MANAGEMENT SYSTEM

(71) Applicant: HITACHI, LTD., Tokyo (JP)

(72) Inventors: Jun Mizuno, Tokyo (JP); Soichi Takashige, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 23 days.

(21) Appl. No.: 16/794,287

(22) Filed: Feb. 19, 2020

(65) Prior Publication Data
US 2021/0048869 A1 Feb. 18, 2021

(30) Foreign Application Priority Data
Aug. 13, 2019 (JP) ............................. JP2019-148690

(51) Int. Cl.
G06F 1/3212 (2019.01)
H04W 52/02 (2009.01)
G06F 1/3228 (2019.01)
G06F 1/3234 (2019.01)

(52) U.S. Cl.
CPC ............ *G06F 1/3212* (2013.01); *G06F 1/325* (2013.01); *G06F 1/3228* (2013.01); *H04W 52/0261* (2013.01)

(58) Field of Classification Search
CPC .. G06F 11/00; G06F 11/3013; G06F 11/3062; G06F 8/654; G06F 1/3212; G06F 1/3228; G06F 1/325; G06F 1/329; H04L 67/34; H04L 67/42; H04W 52/0277; H04W 84/12; H04W 88/02; H04W 8/245; Y02D 30/70

USPC ......................................................... 713/320
See application file for complete search history.

(56) References Cited

U.S. PATENT DOCUMENTS

| | | | |
|---|---|---|---|
| 10,394,542 B1* | 8/2019 | Poenaru | G06F 3/065 |
| 2008/0157924 A1* | 7/2008 | Batra | G06K 19/07749 340/10.1 |
| 2014/0208092 A1* | 7/2014 | Huang | G06F 8/654 713/2 |
| 2015/0007161 A1* | 1/2015 | Yagi | G06F 8/65 717/171 |
| 2016/0011887 A1* | 1/2016 | Chung | G06F 1/266 713/2 |
| 2016/0262105 A1* | 9/2016 | Tomisawa | H04W 52/245 |
| 2018/0091391 A1 | 3/2018 | Turow et al. | |
| 2019/0179627 A1* | 6/2019 | Sugiyama | H04L 67/34 |

* cited by examiner

*Primary Examiner* — Chun Cao
(74) *Attorney, Agent, or Firm* — Volpe Koenig

(57) ABSTRACT

Status information including remaining battery power is collected from a management target device. Subsequent operations of the device are identified from an operation schedule management collection. Battery consumptions corresponding to subsequent operations of the device are estimated from KPI management collection that includes information representing relationships between battery consumptions and operations with respect to each of a plurality of devices. The battery life of the device is predicted based on the estimated battery consumptions and the remaining battery power represented by the collected status information. A circuit schedule of a maintenance engineer is determined based on the predicted battery life, the schedule including necessity of dispatch of the maintenance engineer to the device.

7 Claims, 21 Drawing Sheets

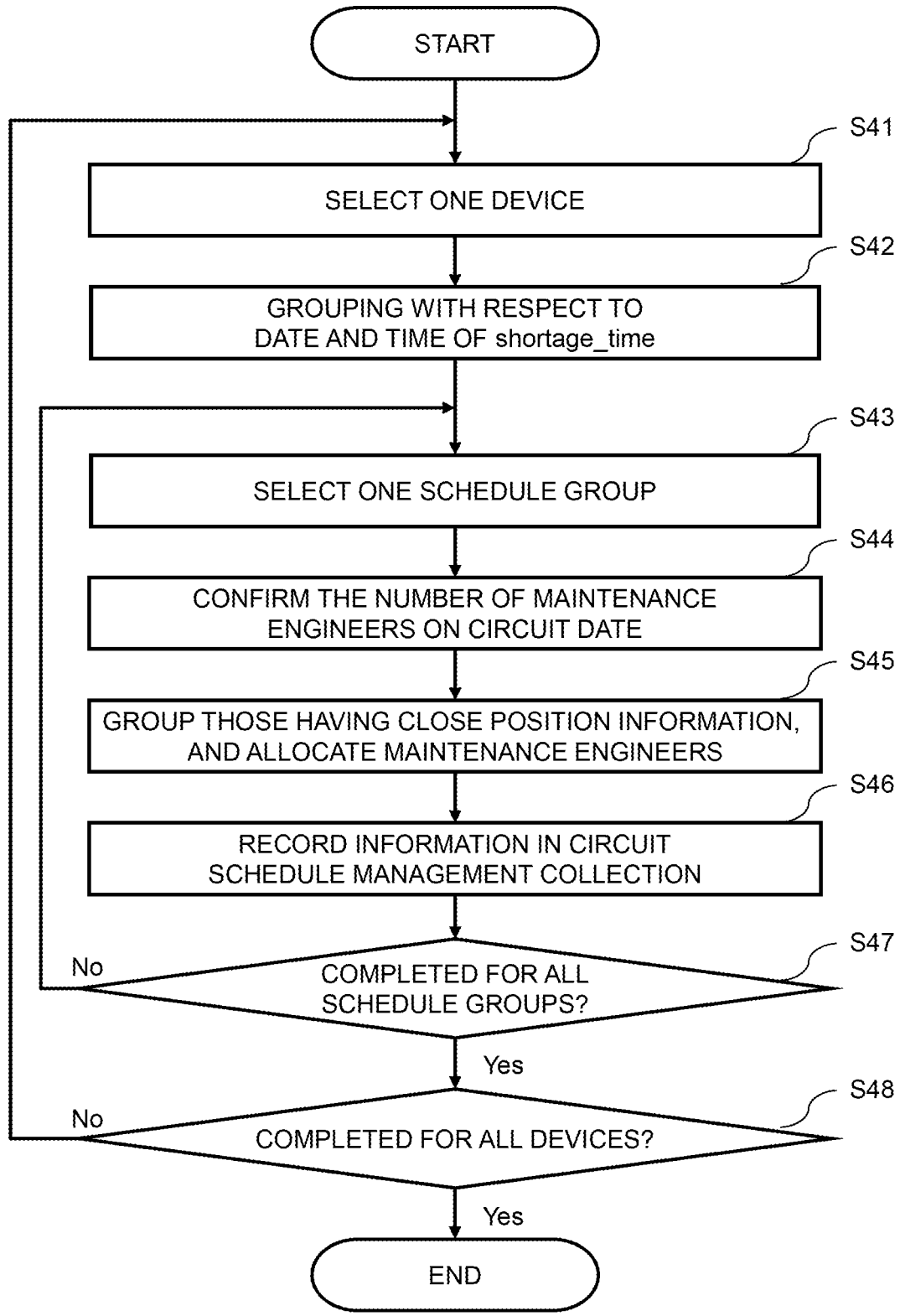

ENERGY SAVING DEVICE MANAGEMENT METHOD AND ENERGY SAVING DEVICE MANAGEMENT SYSTEM

CROSS-REFERENCE TO PRIOR APPLICATION

This application relates to and claims the benefit of priority from Japanese Patent Application number 2019-148690, filed on Aug. 13, 2019, the entire disclosure of which is incorporated herein by reference.

BACKGROUND

The present invention generally relates to an energy saving device management method, and an energy saving device management system.

There is a scheme called IoT (Internet of Things) where "Things," such as sensors and devices, are coupled to a cloud or a server via the Internet, and mutual control is achieved by information exchange. IoT systems require device operation management that encompasses alive monitoring, state monitoring, changes in settings, and firmware updates (hereinafter abbreviated as "µW update") of sensors and devices.

Devices include not only those connected to a power source, but also battery-driven energy saving devices in order to be installed at a place where no power source is available. A maintenance engineer is periodically dispatched to battery-driven devices, and the batteries are replaced. Such battery-driven devices operate so as to be activated only for a required time period and sleep in the other time periods for the sake of achieving a long life to extend the dispatch intervals of the maintenance engineer. Accordingly, if device state confirmation or change in setting is intended to be performed from a management server, the device cannot respond. As a result, there is a problem in that the device cannot be managed.

On the other hand, PTL1 discloses a technique that asynchronously achieves the state confirmation, change in setting, or µW update for a device that is not always connected, using device shadow.

Unfortunately, there is a risk that during asynchronous change in setting or µW update, the cause of an unknown device state cannot be determined, thus causing a device in an unknown state. The causes of an unknown device state can include, for example, a cause that is unmatured activation time, a cause that is impossibility of state notification due to bad communication situations after activation, or a cause that is a failure of µW update and malfunctioning. It cannot be determined which one of such causes delivers the unknown device state. A maintenance engineer is required to rush there in an unscheduled manner and verify the device state. Accordingly, a problem occurs in that a high maintenance cost is required.

PTL1: US2018/0091391

SUMMARY

The technique disclosed in PTL1 requires (A) a technique of avoiding causes (insufficient remaining battery power) other than failures, and (B) a control technique of preventing unknown state situations from being created, in operation management of a battery-driven energy saving device. The present invention has been made to solve the problem described above, and has an object to provide an energy saving device management method that can avoid the insufficient remaining battery power of a device, reduce the period during which the device state is unknown, and reduce the frequency of dispatching the maintenance engineer.

The present invention to solve the problems described above includes: collecting, from a management target device, status information representing status that include remaining battery power of the device; identifying subsequent operations of the device, from operation schedule management information that is information representing schedules of operations of each of a plurality of devices; estimating battery consumptions corresponding to subsequent operations of the device, from KPI management information that includes information representing relationships between battery consumptions and the operations with respect to each of the plurality of devices and includes risk information; predicting battery life of the device, based on the estimated battery consumptions and the remaining battery power represented by the collected status information; and determining a circuit schedule of a maintenance engineer, based on the predicted battery life, the schedule including necessity of dispatch of the maintenance engineer to the device.

The present invention provides an energy saving device management method that can avoid insufficiency of the remaining battery power, reduce a period during which the state is unknown owing to an operation having a risk, reduce wasteful maintenance engineer dispatch, and reduce the maintenance cost.

BRIEF DESCRIPTION OF THE DRAWINGS

FIG. 21 is a flowchart showing the flow of processes of a maintenance manager held by the maintenance management server.

DESCRIPTION OF EMBODIMENTS

Hereinafter, an energy saving device management system and method according to an embodiment of the present invention are described with reference to the drawings. Note that in the following description, information through which an output is obtained in response to an input is sometimes described in representation of "xxx collection." The information may be data having any structure. Accordingly, "xxx collection" can be called "xxx information."

Exemplary Embodiment 1

Figure 1:
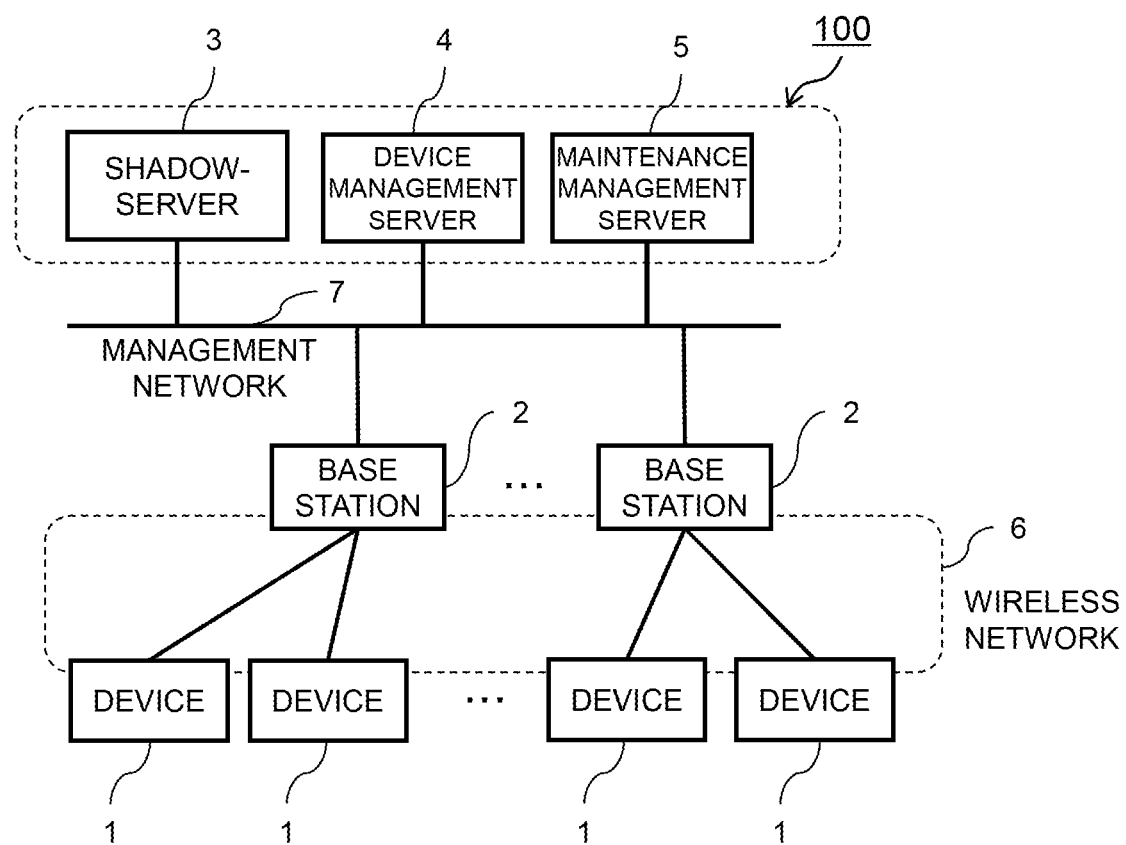
FIG. 1 is a block diagram showing a schematic configuration of an entire system that includes an energy saving device management system according to an embodiment of the present invention.

FIG. 1 is a block diagram showing a schematic configuration of an entire system that includes an energy saving device management system. As shown in FIG. 1, there are at least one device 1, at least one base station 2, a shadow server 3, a device management server 4, and a maintenance management server 5. The devices 1 and the base stations 2 are coupled to each other by a wireless network 6. The base stations 2, the shadow server 3, the device management server 4, and the maintenance management server 5 are coupled to each other by a management network 7. The base station 2 relays communication between the device 1 and the shadow server 3. Here, an example is described where multiple devices 1 are disposed at a remote location in a distributed manner and communication is relayed by multiple base stations 2. The energy saving device management system 100 includes, for example, the shadow server 3, the device management server 4 and the maintenance management server 5. The energy saving device management system 100 may be achieved by one or more computers.

Figure 2:
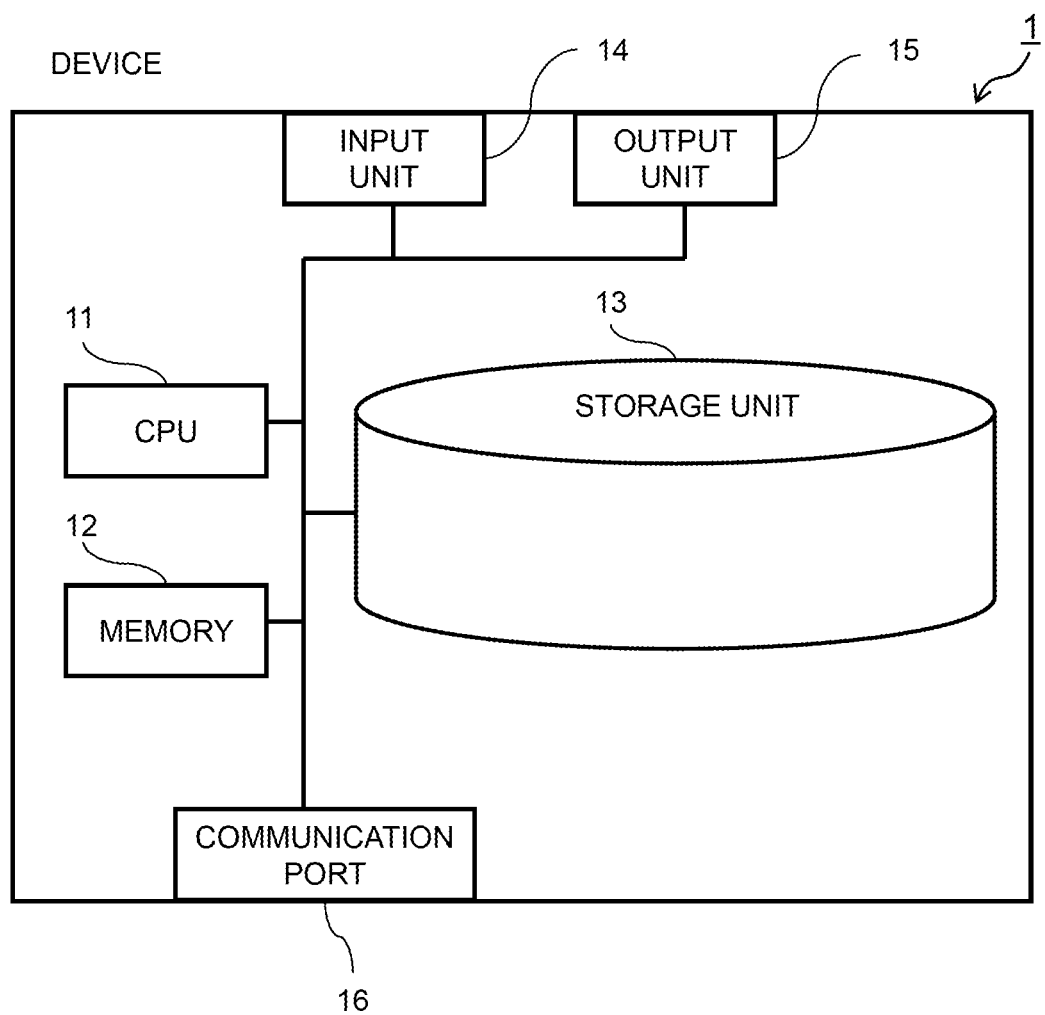
FIG. 2 is a block diagram showing a configuration of a device.

FIG. 2 is a block diagram showing a configuration of a device 1. As shown in FIG. 2, the device 1 includes a memory 12, a storage unit 13, an input unit 14, an output unit 15, a wireless communication port 16, and a CPU (Central Processing Unit) 11 coupled thereto. The device 1 not only transmits the state of this device to the shadow server 3 through the wireless communication port 16 via the base station 2, but also receives setting change notification through communication on a similar path in the reverse direction.

Figure 3:
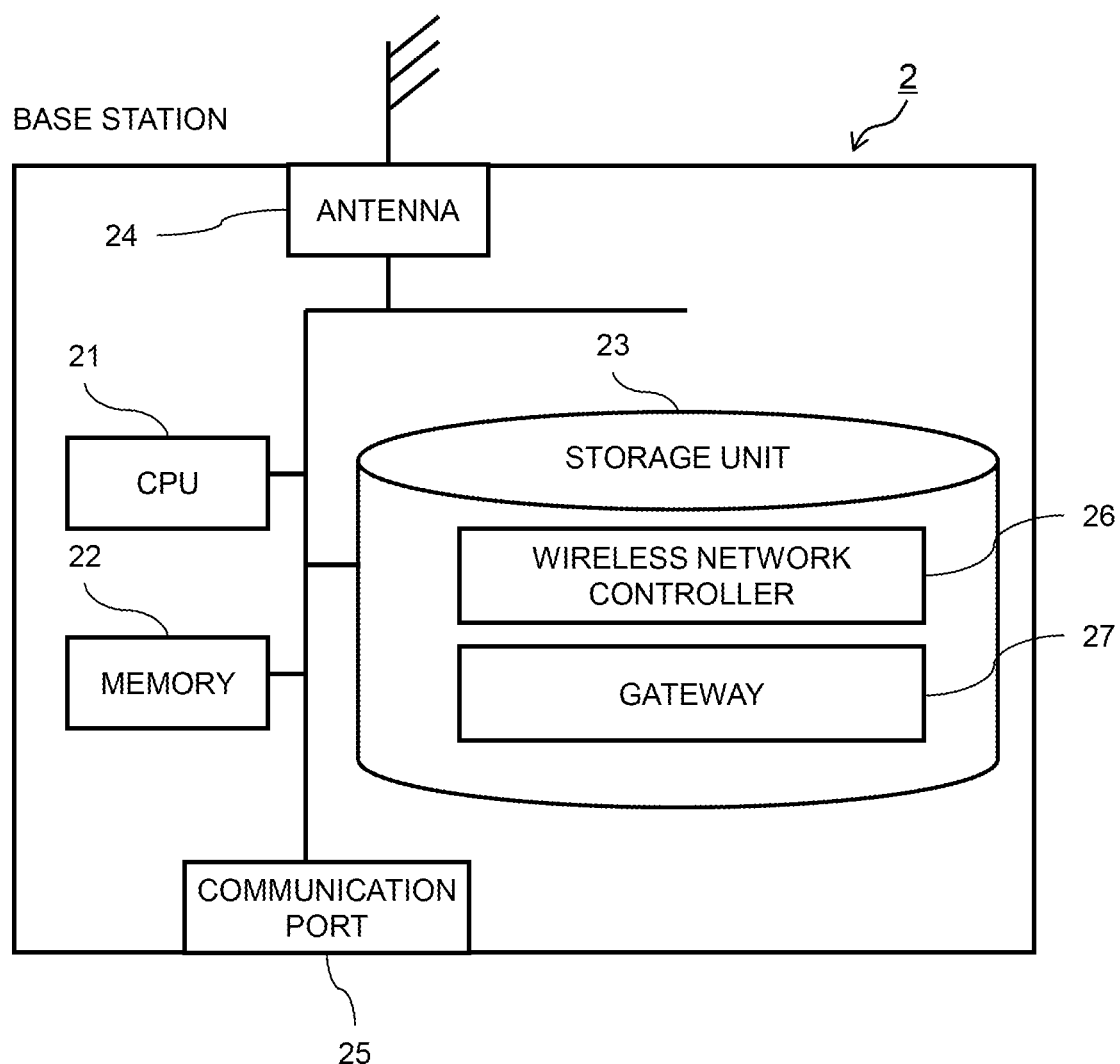
FIG. 3 is a block diagram showing a configuration of a base station.

FIG. 3 is a block diagram showing the configuration of the base station 2. As shown in FIG. 3, the base station 2 includes a memory 22, a storage unit 23, an antenna 24, a communication port 25, and a CPU 21 coupled thereto. The storage unit 23 stores one or more computer programs for allowing the CPU 21 to achieve functions, such as a wireless network controller 26 that establishes coupling between the device 1 and the base station 2, and a gateway 27 that establishes coupling between the base station 2 and devices on the management network 7. The one or more computer programs are loaded on the memory 22 and are executed by the CPU 21, thereby achieving the wireless network controller 26 and the gateway 27. According to such a configuration, the base station 2 relays communication between the device 1 and the shadow server 3.

Figure 4:
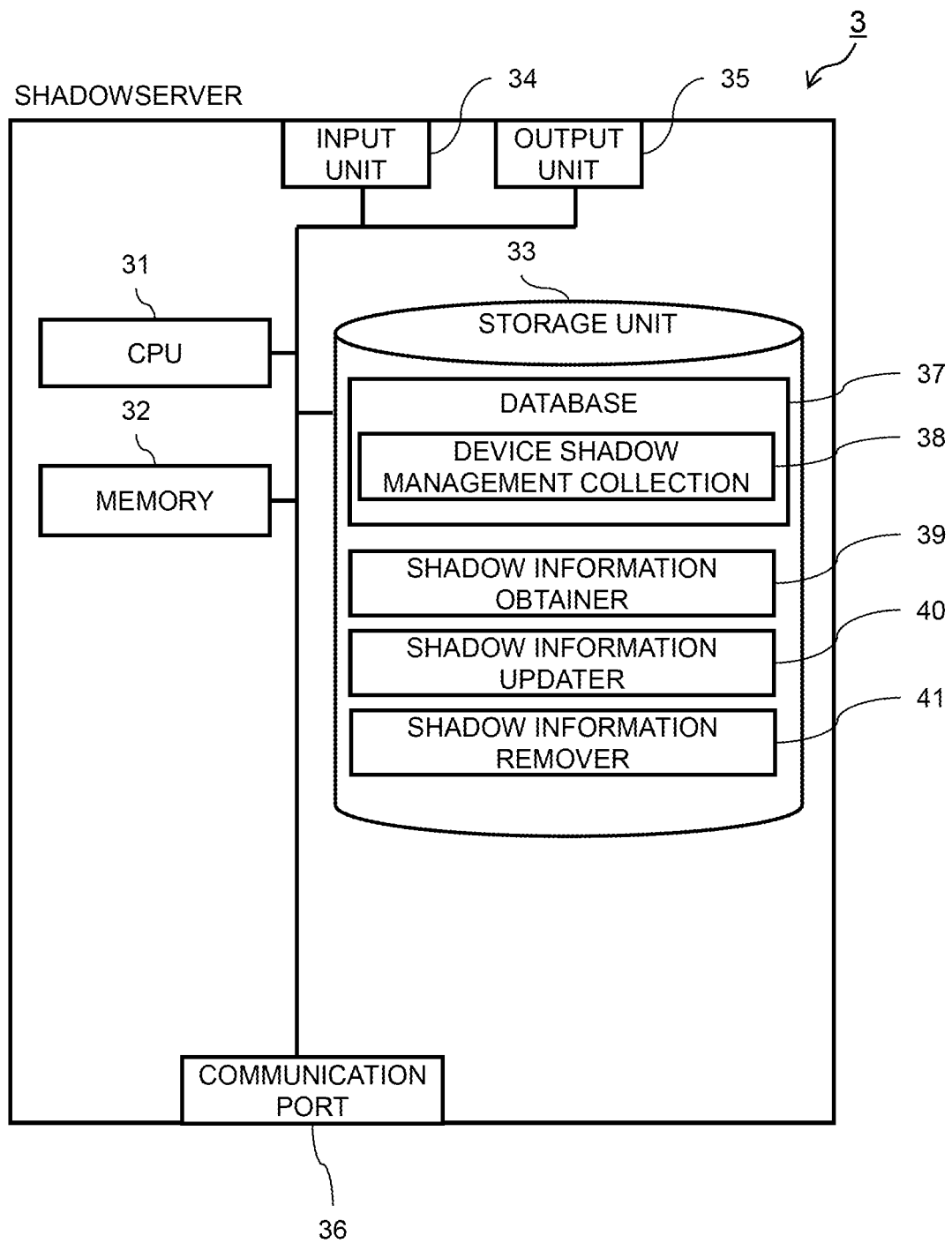
FIG. 4 is a block diagram showing a configuration of a shadow server.

FIG. 4 is a block diagram showing the configuration of a shadow server 3. As shown in FIG. 4, the shadow server 3 includes a memory 32, a storage unit 33, an input unit 34, an output unit 35, a communication port 36, and a CPU 31 coupled thereto.

The storage unit 33 stores a database 37. The storage unit 33 stores one or more computer programs for allowing the CPU 31 to achieve functions, such as a shadow information obtainer 39, a shadow information updater 40, and a shadow information remover 41. The one or more computer programs are loaded on the memory 32 and are executed by the CPU 31, thereby achieving the shadow information obtainer 39, the shadow information updater 40 and the shadow information remover 41. The database 37 includes a device shadow management collection 38 that stores information for device shadow management.

Figure 5:
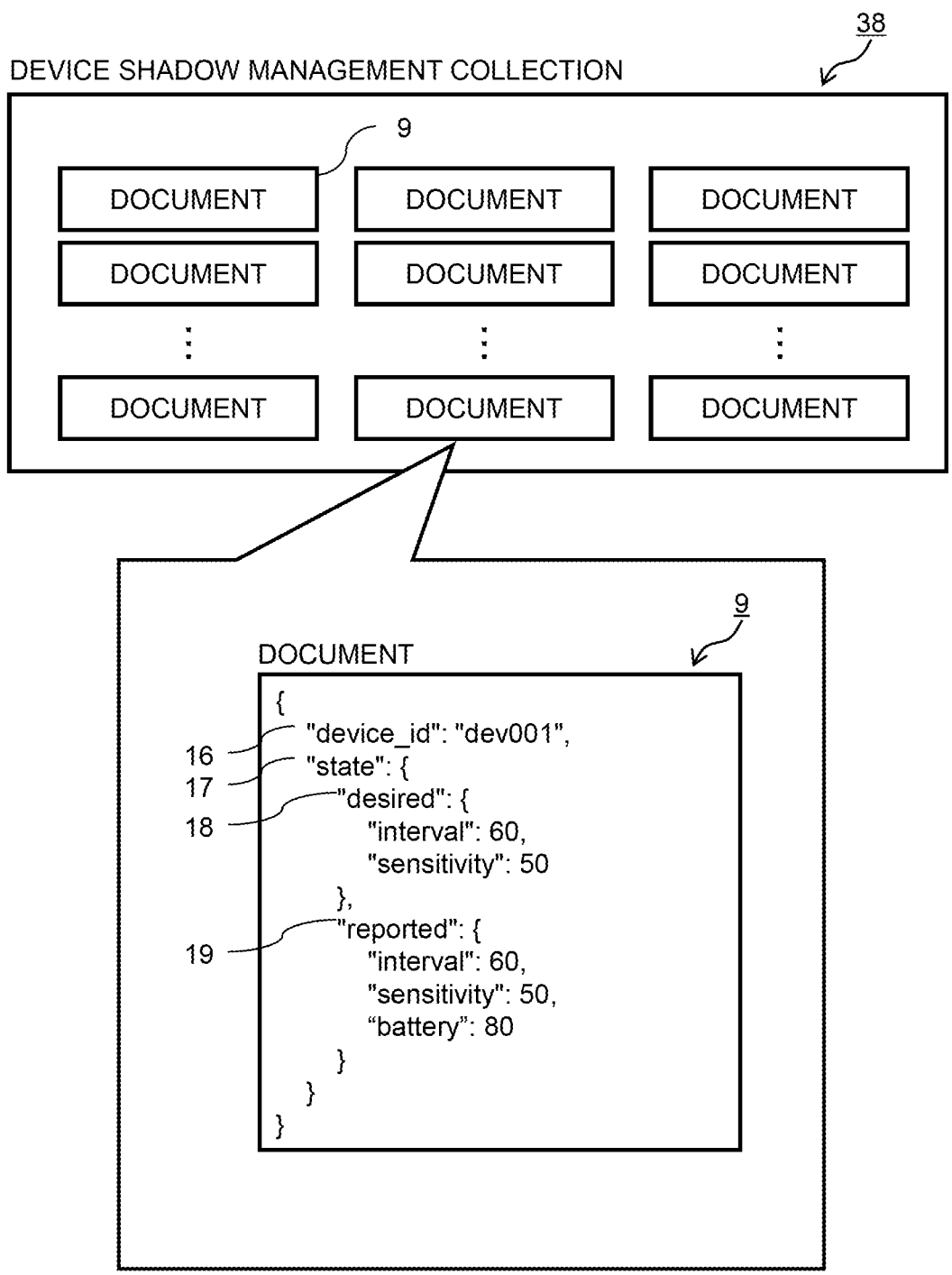
FIG. 5 illustrates a configuration of a device shadow management collection held by the shadow server.

FIG. 5 illustrates the configuration of the device shadow management collection 38. As shown in FIG. 5, the device shadow management collection 38 includes one or more documents 9.

The document 9 is temporary data; software update for each device is not promptly executed, and information is suspended and temporarily reserved as this temporary data, for example. For example, the document 9 includes a device_id 16 that stores a device ID for identifying the device, and a state 17 that stores the state of the device. The state 17 includes a desired 18 that stores a value indicated by an administrator, and a reported 19 that stores the device state transmitted by the device last time. Note that the administrator is a person having an authority of finally determining the circuit schedule of the maintenance engineer in consideration of the insufficient remaining battery power and the update described above. Note that in this specification, "insufficient remaining battery power" means that the remaining battery power reaches or falls below a predetermined threshold (e.g., zero).

Figure 6:
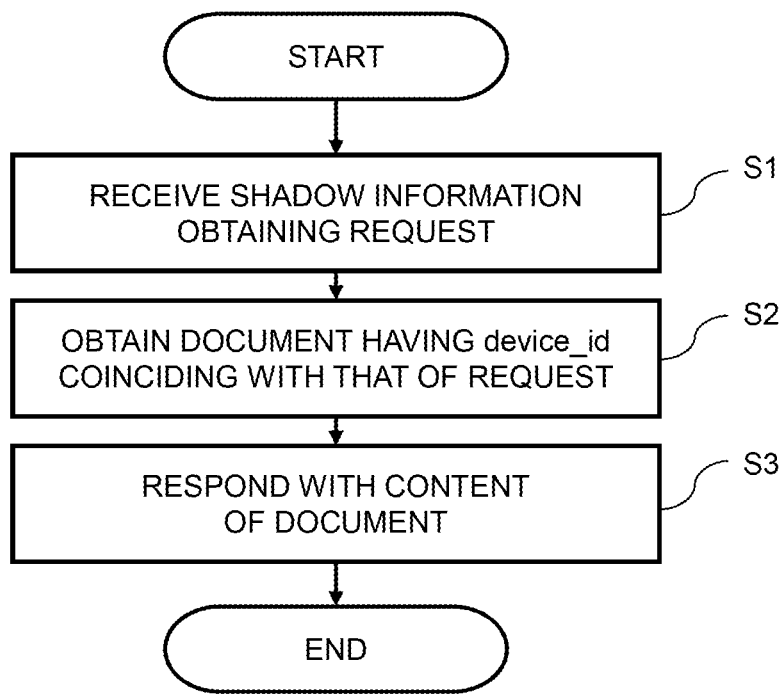
FIG. 6 is a flowchart showing the flow of processes of a shadow information obtainer held by the shadow server.

FIG. 6 is a flowchart showing the flow of processes of the shadow information obtainer 39. As shown in FIG. 6, the shadow information obtainer 39 receives a shadow information obtaining request that designates device_id (S1). The shadow information obtainer 39 then obtains a document 9 that includes the device_id 16 coinciding with device_id designated by the request received in S1, among the documents 9 held by the device shadow management collection 38 (S2). The shadow information obtainer 39 returns the content of the document 9 obtained in S2, as a response to the request received in S1, to the originator of the request received in S1 (S3).

Figure 7:
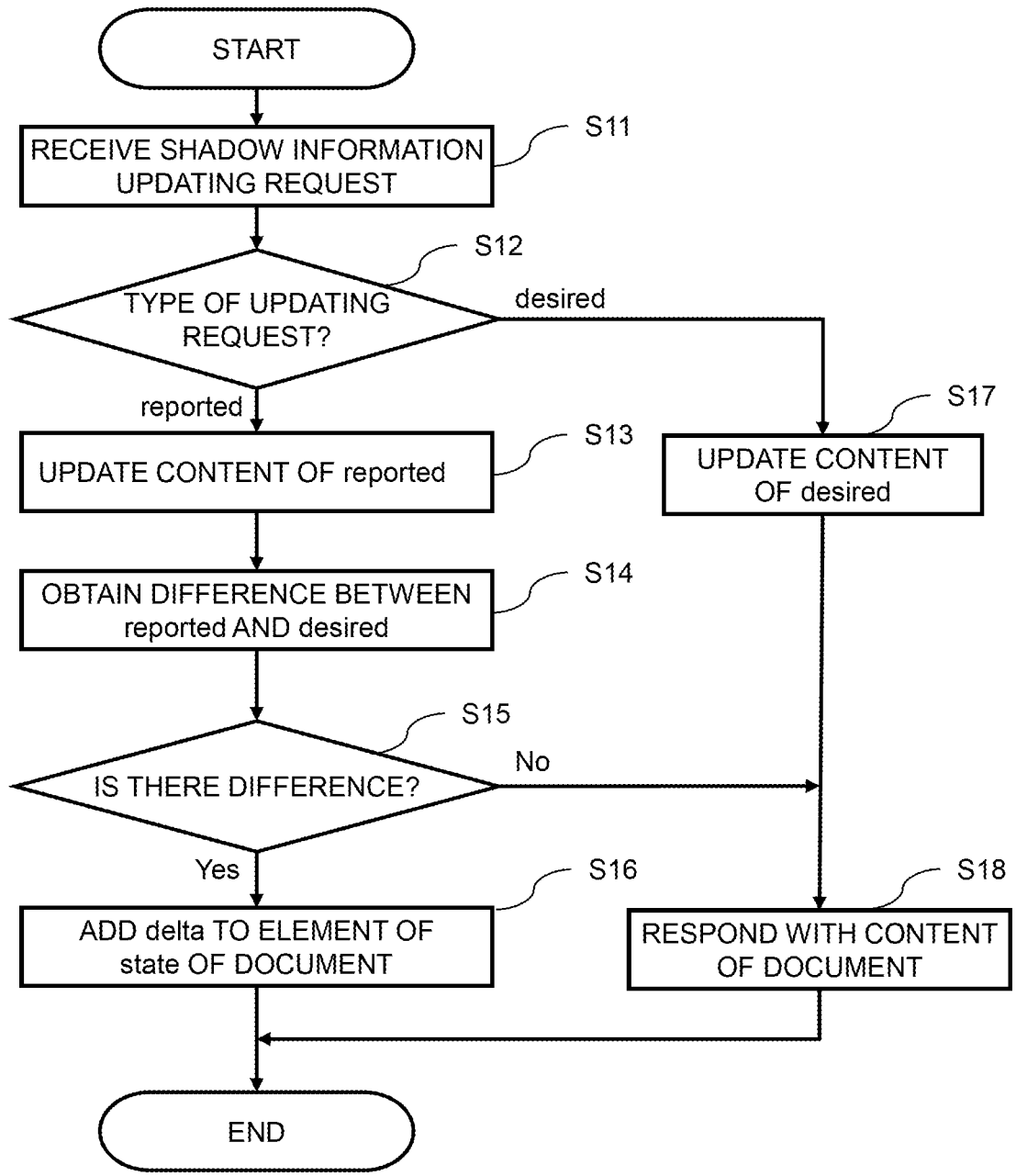
FIG. 7 is a flowchart showing the flow of processes of a shadow information updater held by the shadow server.

FIG. 7 is a flowchart showing the flow of processes of the shadow information updater 40. As shown in FIG. 7, when the shadow information updater 40 receives a shadow information updating request that designates the device_id (S11), this updater verifies the type of the updating request (S12). If the type of the updating request is "reported" (reported in S12), the shadow information updater 40 updates the content of the reported 19 of the target document 9 (the document 9 that includes the device_id 16 coinciding with the device_id designated by the request received in S11) with information included in the updating request (S13).

Next, the shadow information updater 40 obtains the difference between the updated reported 19 and the desired 18 in the target document 9 (S14). If there is a difference (Yes in S15), the shadow information updater 40 adds "delta" that is information indicating the difference obtained in S14 to the target document 9, and responds with "delta" (S16). By responding as described above, the processes of the shadow information updater 40 are finished.

On the contrary, if there is no difference in the process of S14 (No in S15), the shadow information updater 40 responds with the content of the target document 9 (S18). By responding as described above, the processes of the shadow information updater 40 are finished.

If the type of updating request is "desired" in the process of S12 (desired in S12), the shadow information updater 40 updates the content of the desired 18 of the target document 9 with information included in the updating request (S17). Next, the shadow information updater 40 responds with the updated content of the target document 9 (S18). The processes of the shadow information updater 40 have thus been described above. Hereinafter, the processes of the shadow information remover 41 are described.

Figure 8:
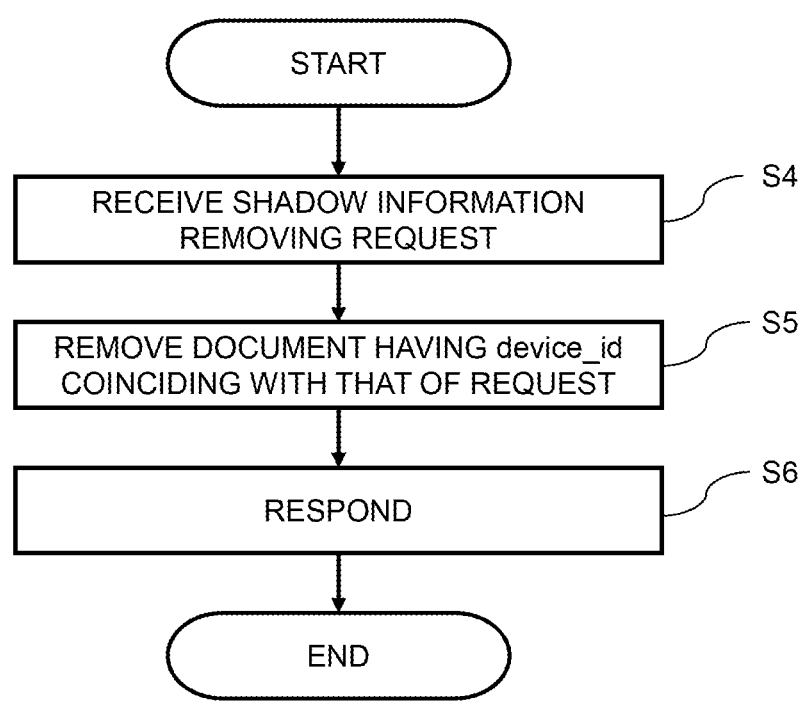
FIG. 8 is a flowchart showing the flow of processes of a shadow information remover held by the shadow server.

FIG. 8 is a flowchart showing the flow of processes of the shadow information remover 41. As shown in FIG. 8, upon receipt of the shadow information removing request that designates device_id (S4), the shadow information remover 41 removes the target document 9 (the document 9 that includes the device_id 16 coinciding with the device_id designated by the request received in S4) among the documents 9 held by the device shadow management collection 38 (S5), and then responds (S6).

Figure 9:
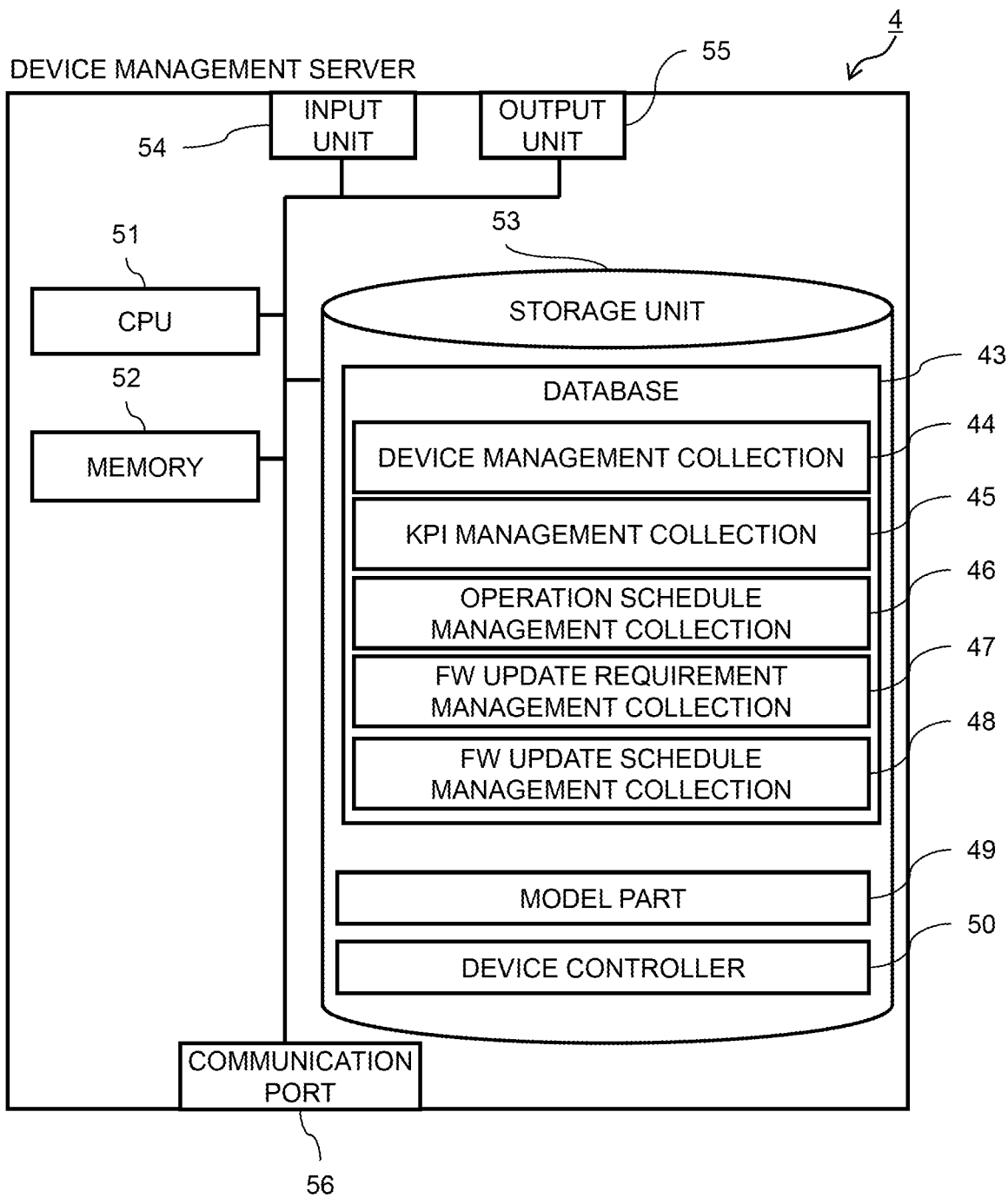
FIG. 9 is a block diagram showing a configuration of a device management server.

FIG. 9 is a block diagram showing the configuration of the device management server 4. As shown in FIG. 9, the device management server 4 includes a memory 52, a storage unit 53, an input unit 54, an output unit 55, a communication port 56, and a CPU 51 coupled thereto. The storage unit 53 stores a database 43. The storage unit 53 stores one or more computer programs for allowing the CPU 51 to achieve functions, such as a model part 49 and a device controller 50. The one or more computer programs are loaded on the memory 52 and are executed by the CPU 51, thereby achieving the model part 49 and the device controller 50.

The database 43 includes a device management collection 44, a KPI (Key Performance Indicator) 45, an operation schedule management collection 46, an µW update requirement management collection 47, and an FW update schedule management collection 48.

Figure 10:
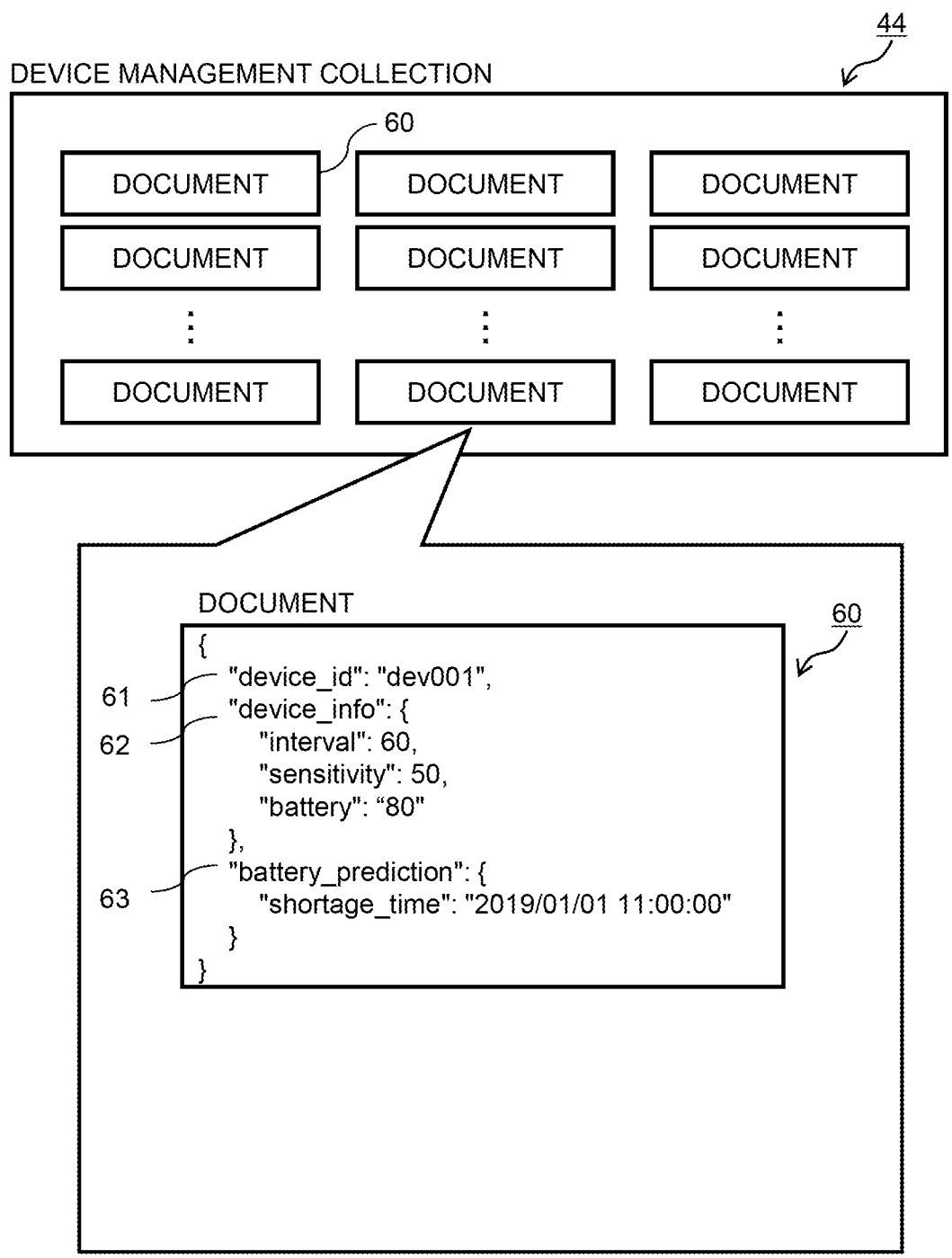
FIG. 10 illustrates a configuration of a device management collection held by the device management server.

FIG. 10 illustrates the configuration of the device management collection 44. As shown in FIG. 10, the device management collection 44 includes one or more documents 60. The document 60 is, for example, data indicating procedures for updating software with respect to each device. For example, the document 60 includes a device_id 61 that holds a device ID for identifying the device, a device_info 62 that holds device information, and a battery_prediction 63 that holds an insufficient remaining battery power predicted date and time (a date and time when the remaining battery power is predicted to become insufficient). Information for calculating these items, for example, "battery_consumption" 67 in FIG. 11 and other items are also included, as risk information, in the KPI management collection 45.

The device_info 62 includes "interval" that holds the interval at which the device transmits data, "sensitivity" that holds the sensitivity of the device, and "battery" that holds the remaining battery capacity (%). The battery_prediction 63 includes "shortage_time" that holds the insufficient remaining battery power predicted date and time.

Figure 11:
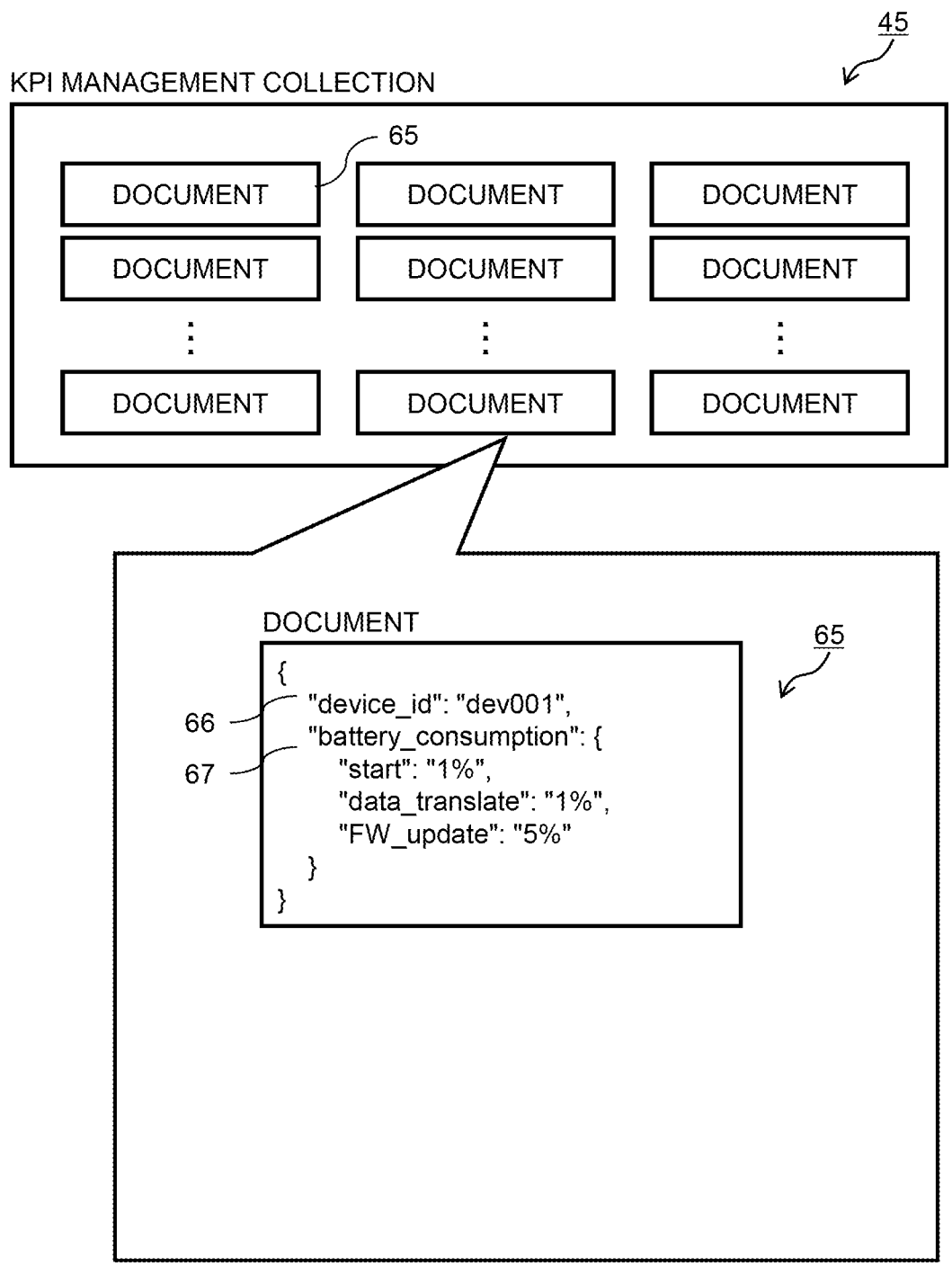
FIG. 11 illustrates a configuration of a KPI management collection held by the device management server.

FIG. 11 illustrates the configuration of the KPI management collection 45. As shown in FIG. 11, the KPI management collection 45 includes one or more documents 65. The document 65 includes a device_id 66 that holds an ID for identifying the device, and a battery_consumption 67 that holds the battery consumption with respect to each operation.

The battery_consumption 67 includes "beginning date" that holds the battery consumption at the device activation, "data_translate" that holds the battery consumption at data transfer, and "FW_update" that holds the battery consumption at FW update.

Figure 12:
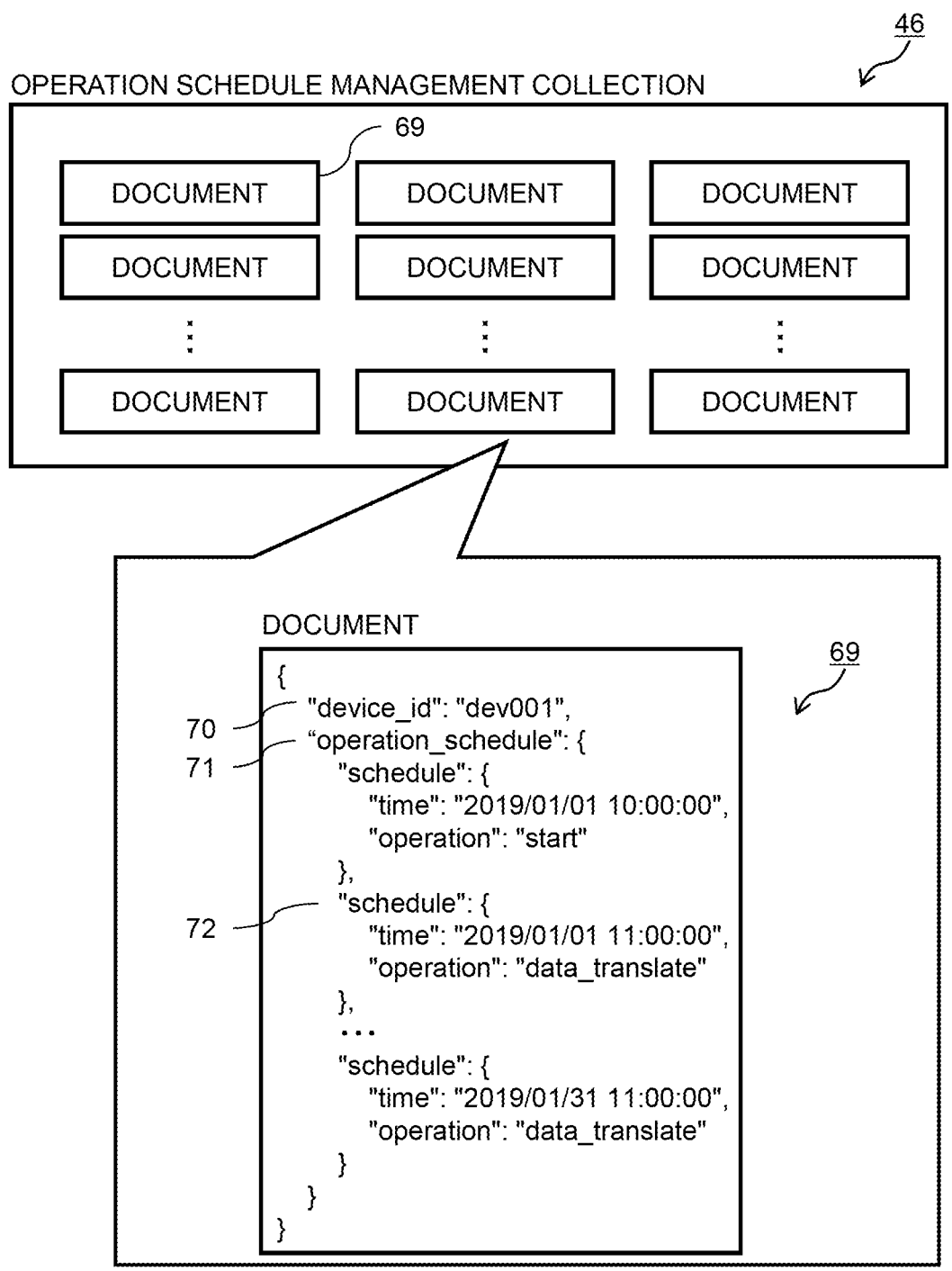
FIG. 12 illustrates a configuration of an operation schedule management collection held by the device management server.

FIG. 12 illustrates the configuration of the operation schedule management collection 46. As shown in FIG. 12, the operation schedule management collection 46 includes one or more documents 69. The document 69 includes information on an operation schedule. The operation schedule is defined by the device controller 50 from the circuit schedule and a subsequent operation plan of each device on the basis of the conditions in steps S34 and S35 in FIG. 16 described later.

The document 69 is, for example, data indicating a schedule of executing software update with respect to each device. The document 69 includes, for example, a device_id 70 that holds an ID for identifying the device, and an operation schedule 71 that holds operation schedule for the device. The operation schedule 71 includes a schedule 72 that holds one or more schedules. The schedule 72 includes "time" that holds the date and time of starting the operation, and "operation" that holds the type of the operation.

Note that information indicating the degree of risk of each operation may be associated with at least one of each document 65 of the KPI management collection 45 and each document 69 of the operation schedule management collection 46. Alternatively, although not shown, a collection risk management collection (not shown) indicating the degree of risk of each operation may be stored in at least one computer in the energy saving device management system 100. The "risk" described here may be any item defined as a risk pertaining to the operation. The "degree of risk" may be any degree.

Figure 13:
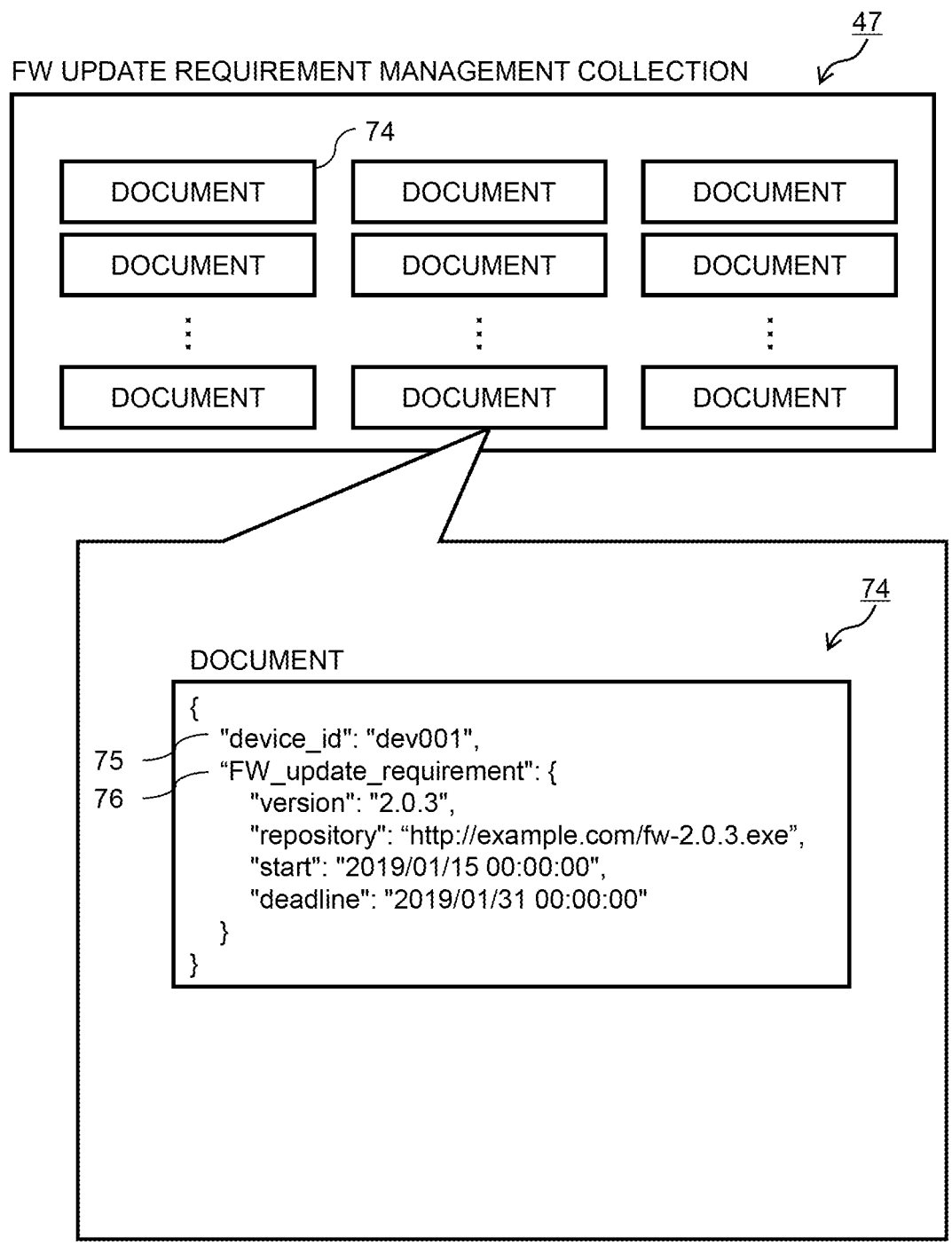
FIG. 13 illustrates a configuration of an µW update requirement management collection held by the device management server.

FIG. 13 illustrates the configuration of the FW update requirement management collection 47. As shown in FIG. 13, the FW update requirement management collection 47 includes one or more documents 74. The document 74 is, for example, data indicating the substantial content of update to be executed by the software in each device. The document 74 includes, for example, a device_id 75 that holds an ID for identifying the device, and an FW_update_requirement 76 that holds the requirement of FW update.

FW_update_requirement 76 represents the execution period of the FW update, and includes, for example, "version" that holds the version of FW to be updated, "repository" that holds the URL of a repository for complementing the update image, "start" that holds the date and time of starting update image distribution, and "deadline" that holds the final due date by which update should be performed.

Note that the FW update is an example of the operation. An operation requirement collection may be prepared for each operation. The collection may include a document for each device. Each document may include a device_id that holds an ID for identifying the device, and an operation requirement that holds the requirement of the operation. The operation requirement represents the execution period of the operation, and includes, for example, "time" that represents the date and time of starting the operation, and "deadline" that represents the deadline of the operation.

Figure 14:
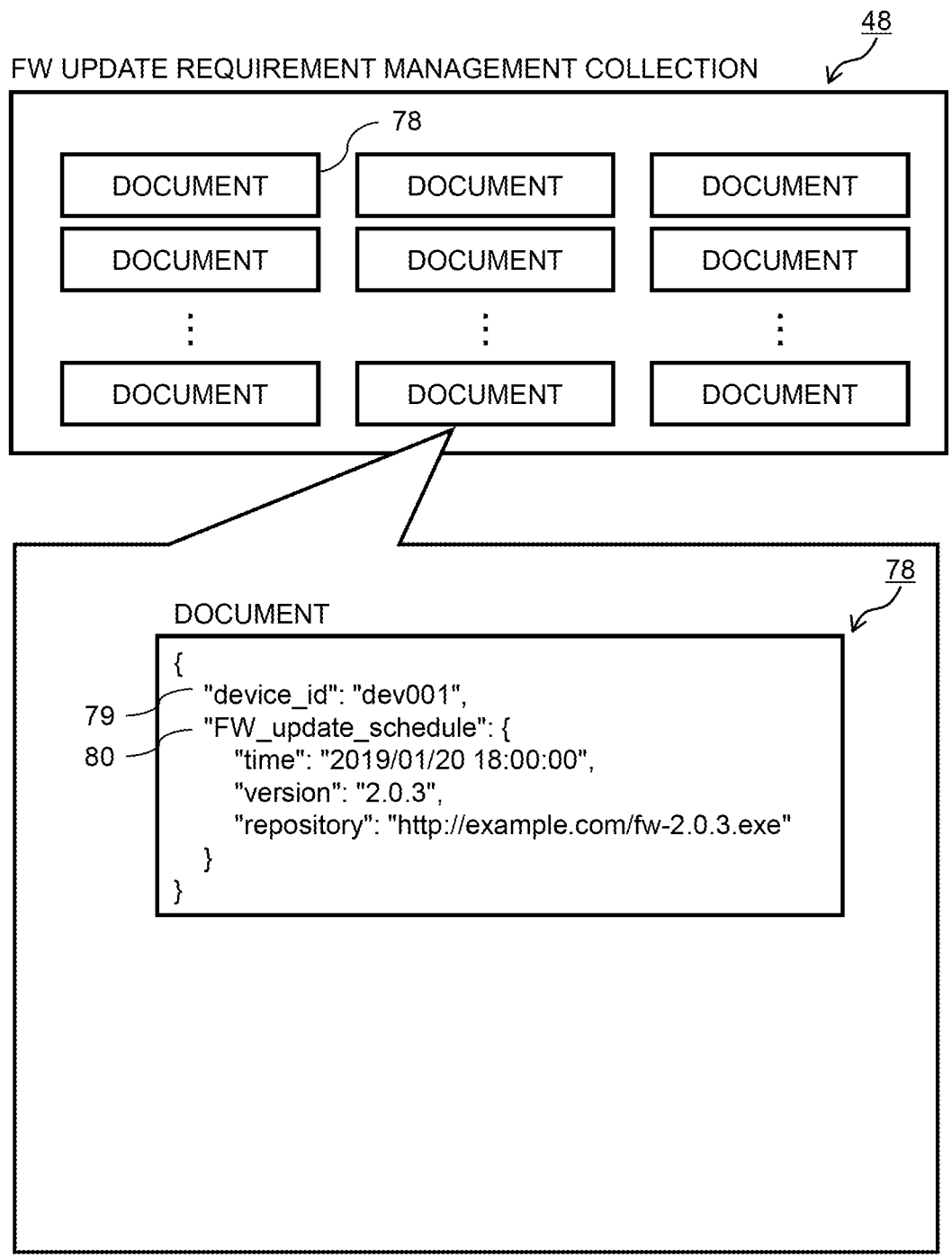
FIG. 14 illustrates a configuration of an µW update schedule management collection held by the device management server.

FIG. 14 illustrates the configuration of the FW update schedule management collection 48. As shown in FIG. 14, the FW update schedule management collection 48 includes one or more documents 78. The document 78 is, for example, data indicating a schedule of executing software update with respect to each device. The document 78 includes a device_id 79 that holds an ID for identifying the device, and an FW_update_schedule 80 that holds the schedule of FW update.

The FW_update_schedule 80 includes "time" that holds the update date and time, "version" that holds the version of FW to be updated, and "repository" that holds the URL of a repository for complementing the update image.

Figure 15:
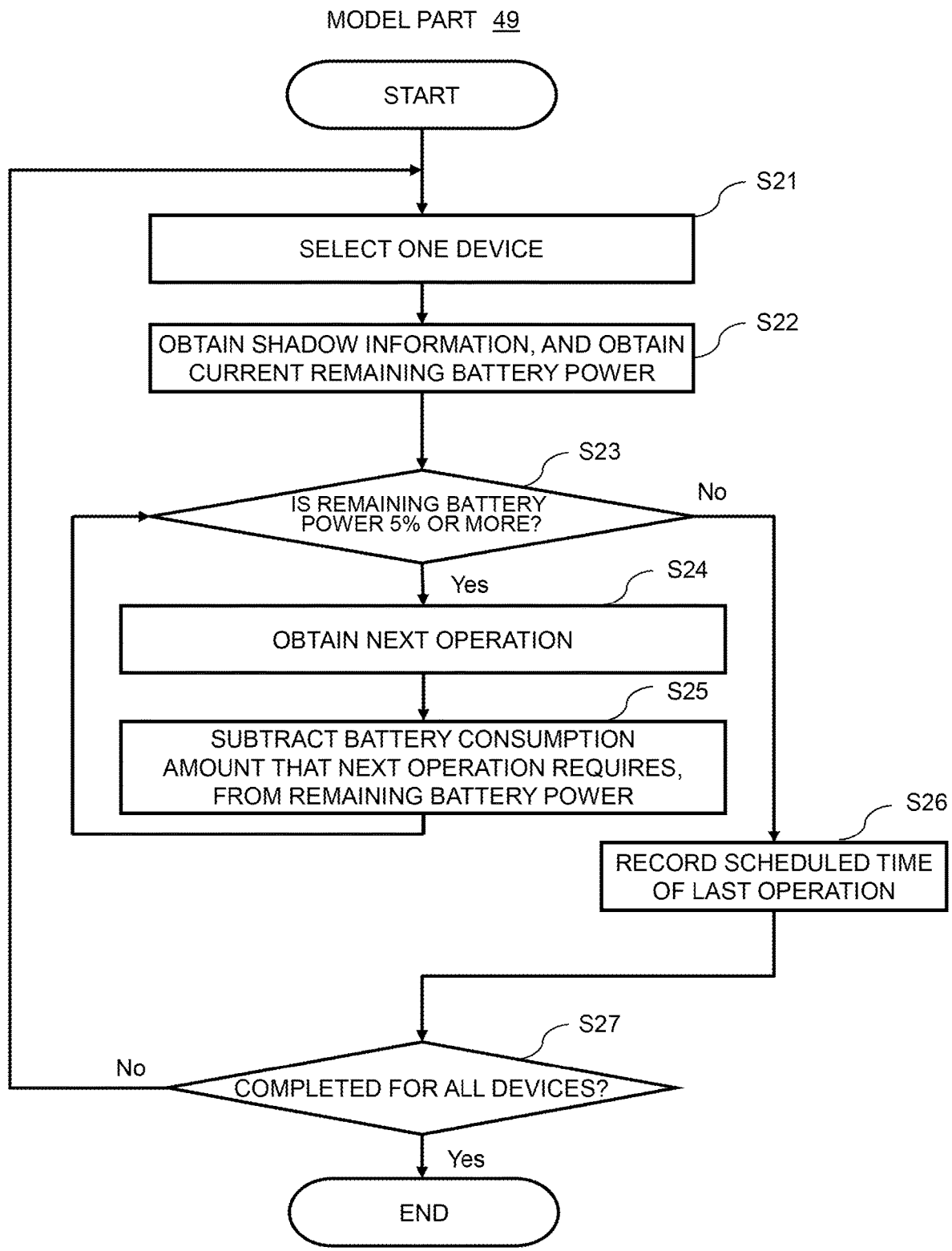
FIG. 15 is a flowchart showing the flow of processes of a model part held by the device management server.

FIG. 15 is a flowchart showing the flow of processes of the model part 49 held by the device management server 4. As shown in FIG. 15, the model part 49 executes a loop process of steps S21 to S27 for all the devices 1 indicated by the device management collection 44. First, the model part 49 selects one device 1 (S21). The device 1 selected here is called "selected device 1" in the description with reference to FIG. 15. Next, the model part 49 obtains shadow information on the selected device 1 from the shadow server 3, and obtains the current remaining battery power from the device management collection 44 of the device management server 4 (S22).

Next, the model part 49 verifies whether or not the remaining battery power is equal to or more than 5% (S23). Note that 5% is an example of the threshold of the remaining battery power. Any value ranging from 0 to 100, inclusive, can be adopted as the threshold. When the remaining battery power is equal to or more than 5% (Yes in S23), the model part 49 obtains information on the next operation (next scheduled operation) with respect to the selected device 1 (S24). Specifically, the model part 49 searches the operation schedule management collection 46 for the document 69 having the device_id 70 coinciding with that of the selected device. The model part 49 obtains information on the next operation, from the retrieved document 69.

The model part 49 subtracts the battery power required for the next operation on the selected device 1, from the remaining battery capacity of the selected device 1 (S25). Specifically, the model part 49 searches the KPI management collection 45 for the document 65 having the device_id 66 coinciding with that of the selected device 1. The model part 49 obtains the battery consumption corresponding to the operation, from the battery_consumption 67 of the retrieved document 65. The model part 49 subtracts the obtained battery consumption from the remaining battery power obtained in S22. After step S25, the processing is returned to step S23 of verifying whether the remaining battery power is equal to or more than 5% or not. When the remaining battery power is less than 5% in the process of step S23, (No in S23), the processing proceeds to step S26.

In step S26, the model part 49 obtains the scheduled time of the last operation, from the document 69 retrieved in S24. The scheduled time obtained here is recorded as the value of "shortage_time" of the battery_prediction 30 in the document 60 having device_id 61 coinciding with that of the selected device in the device management collection 44 (S26). As for the processes of steps S22 to S26 described above, for every device held in the device management collection 44, the loop process of steps S21 to S27 is executed. As described above, the model part 49 updates the KPI management collection 45 on the basis of the past operation history and the remaining battery power history of the device 1. As a result, accompanied by update of the KPI management collection 45, the battery consumption and the risk information that are for the operation on each device 1 and are stored in the KPI management table are corrected, and the accuracy is improved. The processes performed by the model part 49 have thus been described above.

Figure 16:
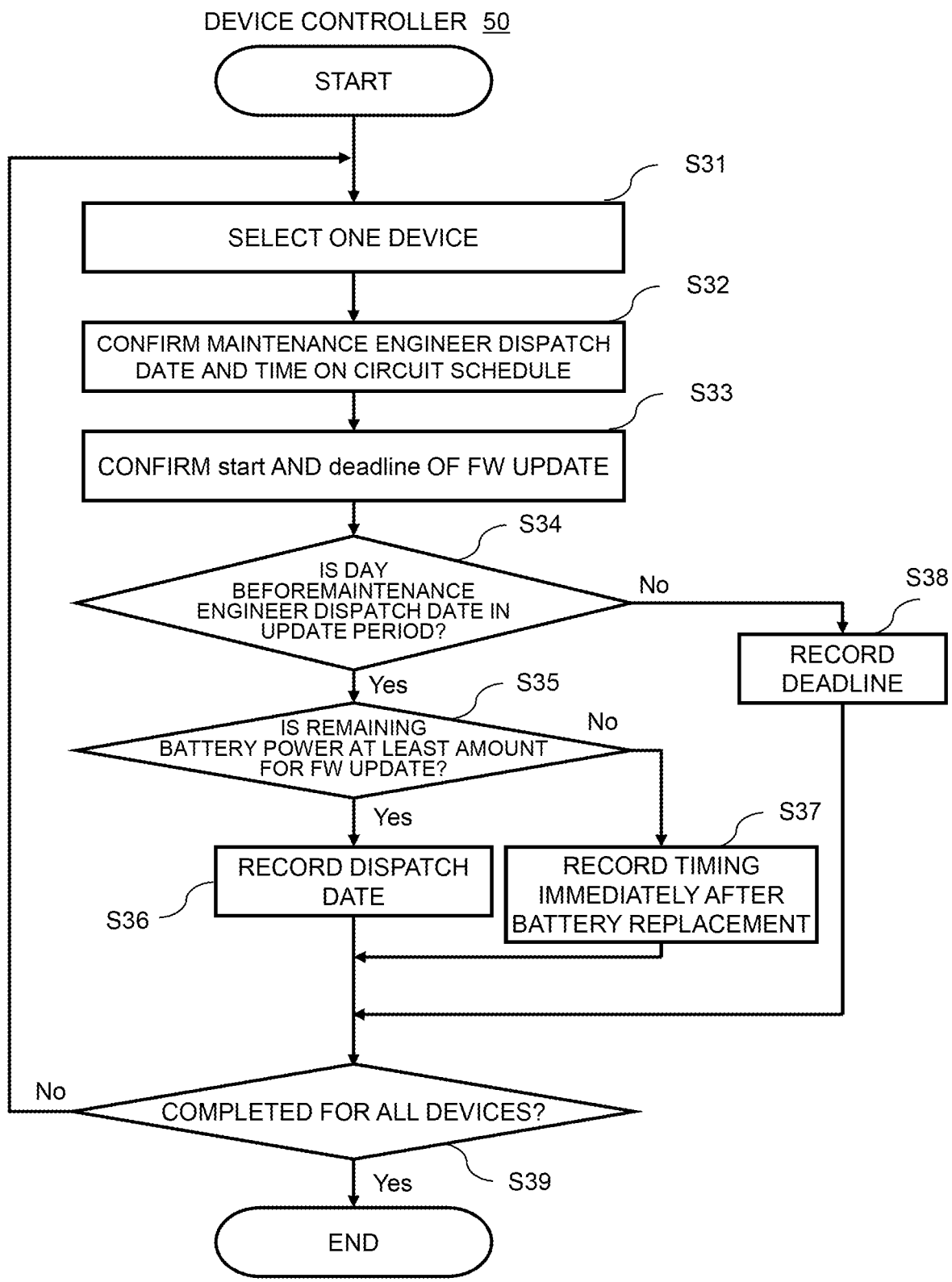
FIG. 16 is a flowchart showing the flow of processes of a device controller held by the device management server.

FIG. 16 is a flowchart showing the flow of processes of the device controller 50 held by the device management server. As shown in FIG. 16, the device controller 50 executes a loop process of steps S31 to S39 for all the devices 1 indicated by the device management collection 44. First, the device controller 50 selects one device 1 (S31). The device 1 selected here is called "selected device 1" in the description with reference to FIG. 16. Next, the device controller 50 obtains the circuit schedule of the maintenance engineer from the maintenance management server 5, and confirms the date and time when the maintenance engineer is dispatched to the selected device 1, with reference to the obtained circuit schedule (S32).

Next, the device controller 50 searches for the document 74 including the device_id 75 coinciding with that of the selected device 1, from the FW update requirement management collection 47, and confirms the start time and deadline of the FW update (specifically, "start" and "deadline" in the FW_update_requirement 76) from the retrieved document 74 (S33). Next, the device controller 50 verifies whether the day before the maintenance engineer dispatch date (the day before the date and time identified in S32) is included in the period between "start" and "deadline" identified S33 (S34).

If the day is in the period (Yes in S34), the device controller 50 confirms whether the remaining battery power of the selected device 1 is at least the amount for FW update (S35). Specifically, the device controller 50 searches the KPI management collection 45 for the document 65 including the device_id 66 coinciding with that of the selected device 1. The device controller 50 obtains the battery consumption corresponding to the operation that is the FW update, from the battery_consumption 67 of the retrieved document 65. If the obtained battery consumption is equal to or more than the remaining battery power of the selected device 1, the remaining battery power is at least the amount for FW update.

If the remaining battery power is at least the amount for FW update (Yes in S35), the device controller 50 records the day before the maintenance engineer dispatch date in "time" in the FW_update_schedule 80 of the target document 78 (the document 78 having the device_id 79 coinciding with that of the selected device 1 in the FW update schedule management collection 48) (S36). The device controller 50 records "version" and "repository" of the target document 74 (the document 74 having device_id 75 coinciding with that of the selected device 1 in the FW update requirement management collection 47) in the "version" and "repository" of the FW_update_schedule 80 (S36).

On the contrary, if the remaining battery power is less than the amount for FW update (No in S35), the device controller 50 records the date and time immediately after battery replacement in "time" of the FW_update_schedule of the target document 78 (S37). The device controller 50 records "version" and "repository" of the target document 74 in the "version" and "repository" of the FW_update_ schedule 80 (S37).

If the day is not included in the period in the process of step S34 (No in S34), the device controller 50 records the date and time of the deadline ("deadline") in "time" in FW_update_schedule 80 of the target document 78 (S38). The device controller 50 records "version" and "repository" of the target document 74 in the "version" and "repository" of the FW_update_schedule 80 (S38). As for the processes of steps S32 to S38 described above, for every device 1 held in the device management collection 44, the loop process of steps S31 to S39 is executed. The processes performed by the device controller 50 have thus been described above.

Figure 17:
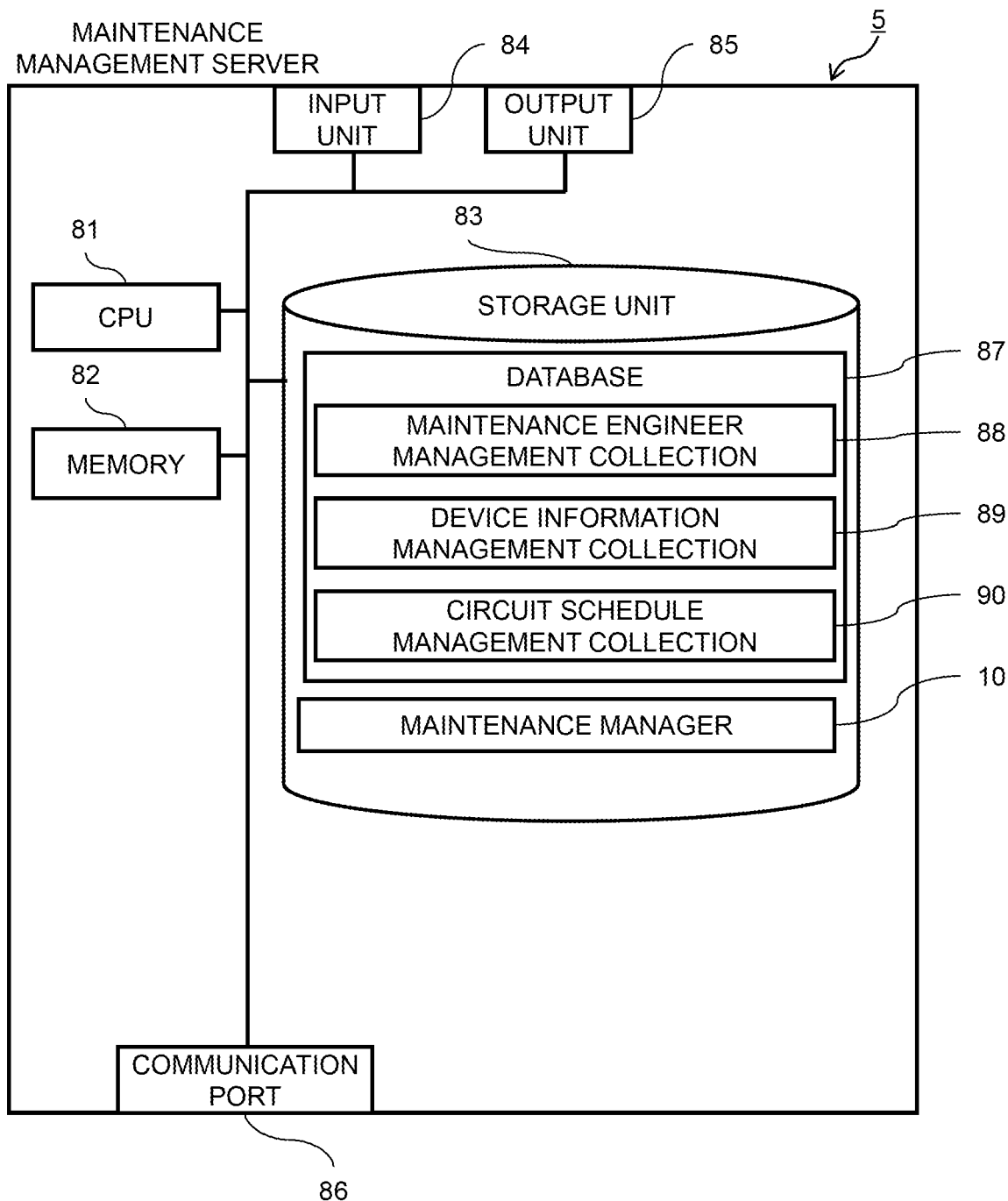
FIG. 17 is a block diagram showing a configuration of a maintenance management server.

FIG. 17 is a block diagram showing the configuration of the maintenance management server 5. As shown in FIG. 17, the maintenance management server 5 includes a memory 82, a storage unit 83, an input unit 84, an output unit 85, a communication port 86, and a CPU 81 coupled thereto. The storage unit 83 stores a database 87. The storage unit 83 stores one or more computer programs for allowing the CPU 81 to achieve functions, such as a maintenance manager 10. The one or more computer programs are loaded on the memory 82 and are executed by the CPU 81, thereby achieving the maintenance manager 10. The database 87 includes a maintenance engineer management collection 88, a device information management collection 89, and a circuit schedule management collection 90.

Figure 18:
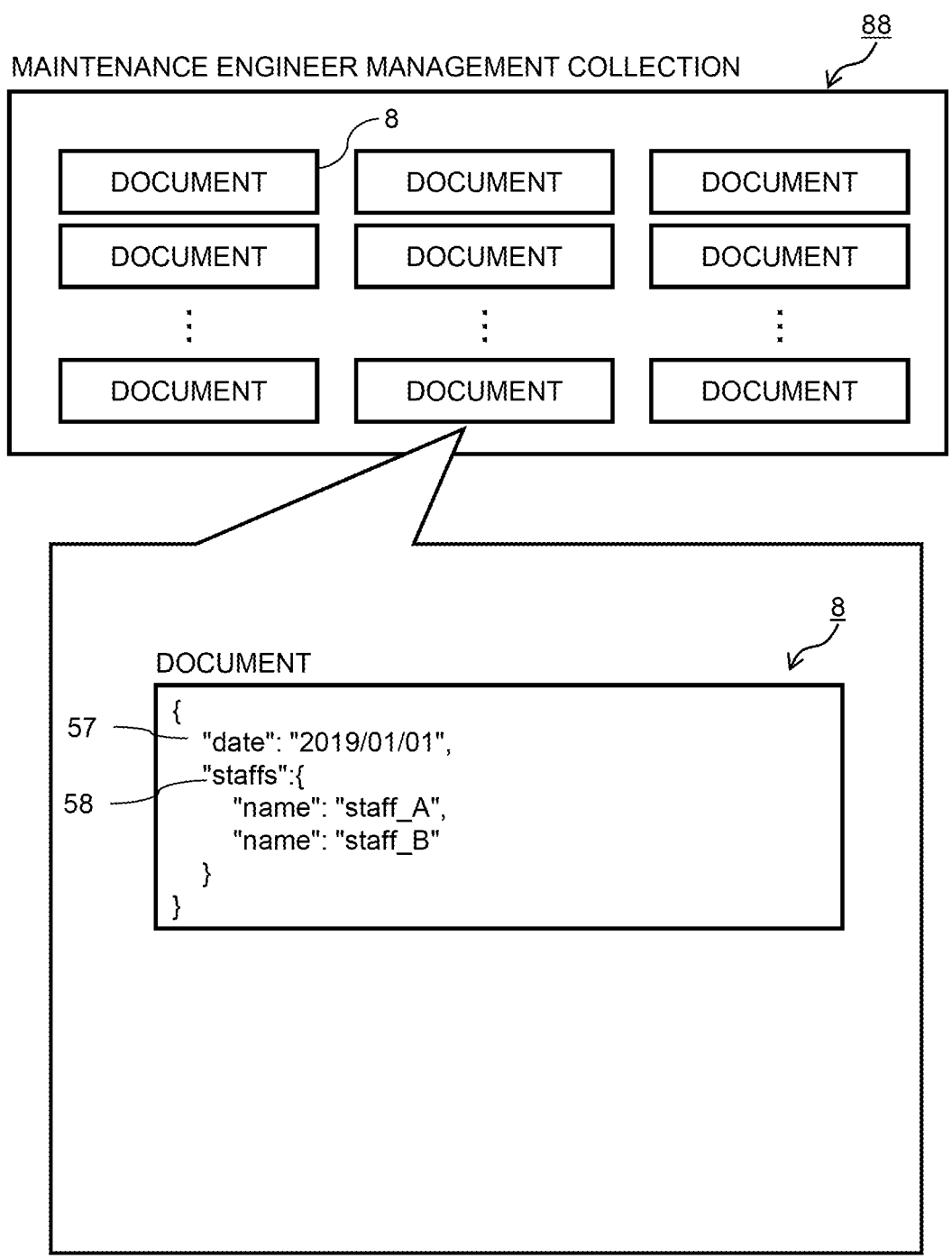
FIG. 18 illustrates a configuration of a maintenance engineer management collection held by the maintenance management server.

FIG. 18 illustrates the configuration of the maintenance engineer management collection 88. As shown in FIG. 18, the maintenance engineer management collection 88 includes one or more documents 8. The document 8 is data representing allocation of maintenance engineers. The document 8 includes, for example, date 57 that holds an ID for identifying the maintenance engineer dispatch date, and staffs 158 that holds dispatchable maintenance engineers. The staffs 158 includes "name" that identifies each of one or more maintenance engineers.

Figure 19:
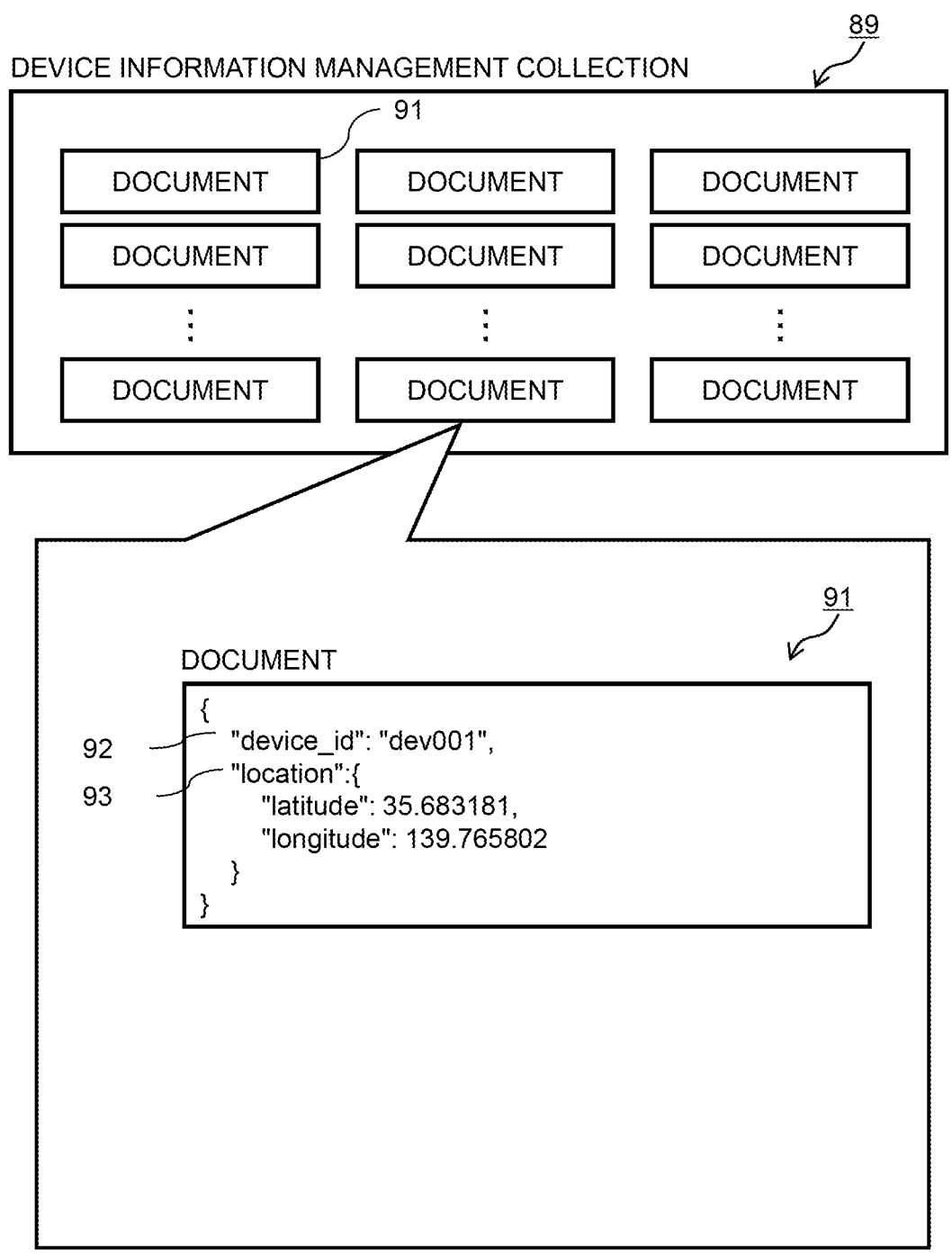
FIG. 19 illustrates a configuration of a device information management collection held by the maintenance management server.

FIG. 19 illustrates the configuration of the device information management collection 89. As shown in FIG. 19, the device information management collection 89 includes one or more documents 91. The document 91 is for identification by the position of the device. The document 91 includes, for example, a device_id 92 that holds an ID for identifying the device, and a location 93 that holds position information on the device installation place. The location 93 includes "latitude" that holds the latitude, and "longitude" that holds the longitude.

Figure 20:
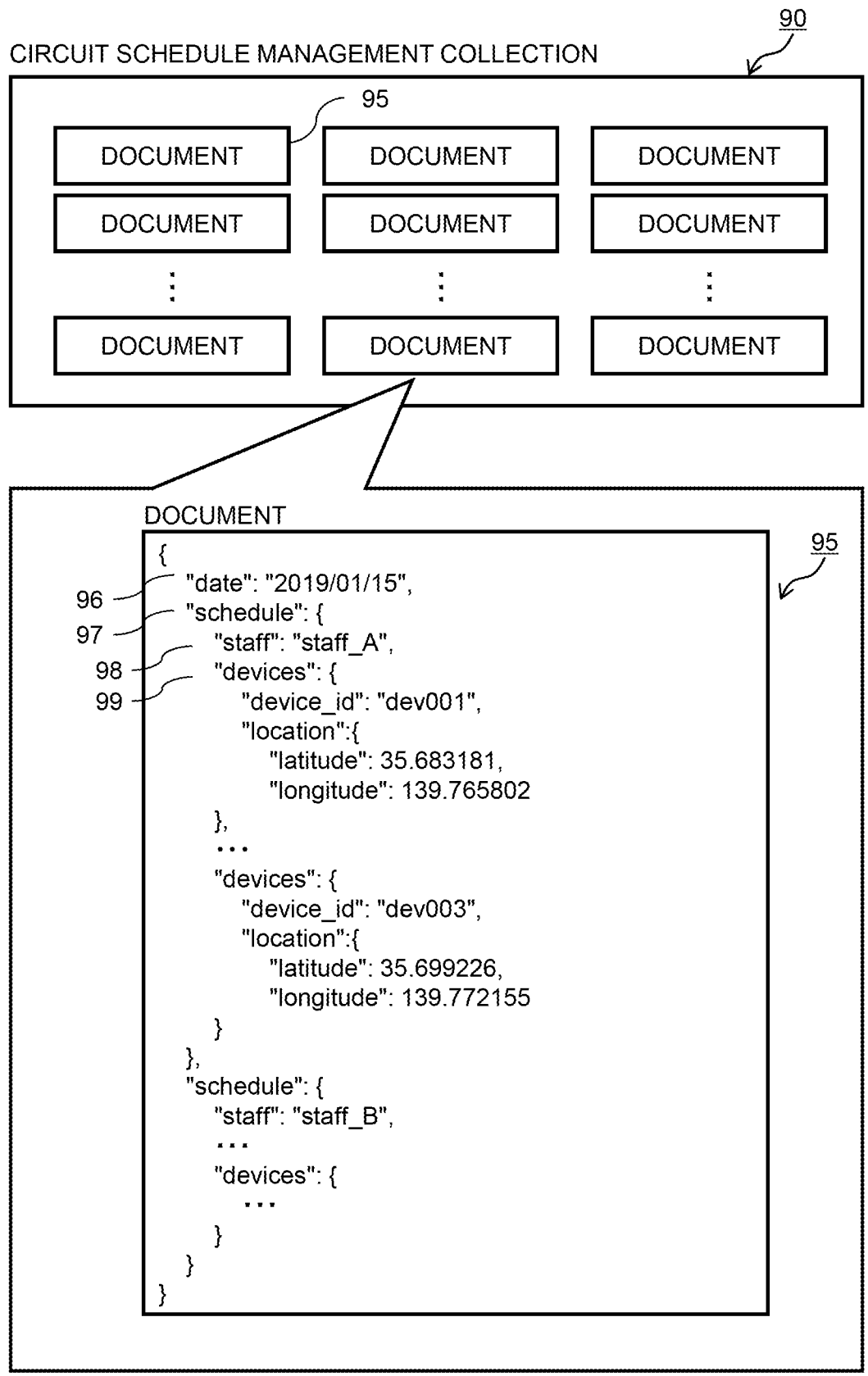
FIG. 20 illustrates a configuration of a circuit schedule management collection held by the maintenance management server.

FIG. 20 illustrates the configuration of the circuit schedule management collection 90. As shown in FIG. 20, the circuit schedule management collection 90 includes one or more documents 95. The document 95 is data representing the schedule of causing the maintenance engineer to go to each device identified by the position. The document 95 includes a date 96 that holds the maintenance engineer dispatch date, and a schedule 197 that holds the circuit schedule(s) of one or more maintenance engineers.

The schedule 197 includes staff 98 that holds the maintenance engineer(s) to be dispatched, and devices 99 that holds device information on one or more dispatch destinations. The devices 99 includes "device_id" that holds an ID for identifying the device, and "location" that holds the device position information. The "location" includes "latitude" that holds the latitude, and the "longitude" that holds the longitude.

FIG. 21 is a flowchart showing the flow of processes of the maintenance manager 10 held by the maintenance management server. As shown in FIG. 21, the maintenance manager 10 executes a loop process of steps S41 to S48 for all the devices 1 indicated by the device information management collection 89. First, the maintenance manager 10 selects one device 1 (S41). The device 1 selected here is called "selected device 1" in the description with reference to FIG. 21. Next, the maintenance manager 10 obtains a remaining battery power prediction of the selected device 1 from the device management server 4, and performs grouping according to the time schedule of "shortage_time" (S42). That is, devices for which the circuit date of the maintenance engineer is before a day when the battery is to be exhausted and required to be replaced, are extracted.

Here, the loop process of steps S43 to S47 are executed for every time schedule described above. Hereinafter, one time schedule is exemplified ("target time schedule" in the description with reference to FIG. 21). First, the maintenance manager 10 confirms the number of maintenance engineers for the target document 95 (the circuit date (target time schedule) from the document 95 on the target time schedule in the circuit schedule management collection 90) (S44). Next, the maintenance manager 10 uses "location" of the document 95 to group devices 1 having position information indicating close ranges from each other with respect to the number of maintenance engineers, and allocates the maintenance engineers to the respective groups (S45). According to "location" of the document 95, the position information on each of the multiple devices 1 can be identified on the basis of the longitude and the latitude. Based on the position information, grouping is performed with respect to devices 1 close to each other and the number of maintenance engineers so as to achieve efficient circuit.

The maintenance manager 10 records, in the target document 95, the maintenance engineer allocated in the process of step S45 in association with the staff 98, in the schedule 97 on the date 96 used for the grouping (S46). That is, the maintenance manager 10 records, in the document 95, information that associates a device 001 with the circuit schedule of a maintenance engineer A on Jan. 15, 2015 (S46). The processes performed by the maintenance manager 10 have thus been described above. Through such processes, the maintenance manager 10 determines that the nearby maintenance engineer goes to the device 1 having the degree of remaining battery power insufficient for the next circuit by the maintenance engineer, before the battery is exhausted.

As described above, the energy saving device management method according to the exemplary embodiment 1 can achieve (A) avoidance of causes (insufficient remaining battery power) other than a failure, and (B) control of preventing unknown state situations. Accordingly, reduction in wasteful maintenance engineer dispatch can reduce the maintenance cost.

Exemplary Embodiment 2

The configuration of an energy saving device management system according to an exemplary embodiment 2 is substantially similar to the configuration of the energy saving device management system 100 according to the exemplary embodiment 1, but is different in that the priority, not shown, is added to a device_info 62 of the document 60 (FIG. 10) in the device management collection 44 of the device management server 4 shown in FIG. 9.

In the energy saving device management system of the exemplary embodiment 2, the device administrator determines whether each device 1 should be always managed or not according to the IoT solution requirement, and defines the priority value on the basis of the priority. For example, when the maximum value of the priority is five, the minimum value of the priority can be one. According to the processes of the device controller 50 shown in FIG. 16, grouping is performed with respect to high priority values in the loop process of steps S31 to S39, and subsequently, processes similar to those of the energy saving device management system 100 of the exemplary embodiment 1 are performed.

The energy saving device management system of the exemplary embodiment 2 can schedule an operation, such as FW update, for devices 1 used for an IoT solution having high importance on a priority basis. Through such discrimination on a priority basis, the energy saving device management system of the exemplary embodiment 2 can avoid a malfunction that the state where the device 1 for an IoT solution having a high priority has a risk continues long owing to the management of devices for IoT solutions that have a low priority and are allowed to be stopped.

Exemplary Embodiment 3

The configuration of an energy saving device management system according to an exemplary embodiment 3 is substantially similar to the configuration of the energy saving device management system 100 according to the exemplary embodiment 1, but is different in that a KPI management collection creator (not shown) that creates the KPI management collection 45 is added to the device management server 4 shown in FIG. 9. The KPI management collection creator holds, as an operation, the operation corresponding to operation_schedule 71 of the device_id 70 concerned, in the past operation schedule management collection 46 (FIG. 12).

Furthermore, the remaining battery power in the time period is obtained from the device management collection 44, and the battery consumption by the operation is calculated. Here, the battery consumption for each device 1 and each operation may be calculated using past data by machine learning or the like. The energy saving device management system of the exemplary embodiment 3 can reserve the correctness of KPI even in a case where the KPI changes according to the state of the installation place.

Hereinafter, the description described above can be generally overviewed as follows.

[1] An energy saving device management method includes the following procedures. First, status information representing statuses that include remaining battery powers of management target devices 1 is collected from management target devices 1. Subsequent operations of the devices 1 are identified from the operation schedule management collection (information) 46 that is information representing operation schedules of each of a plurality of the devices 1. Battery consumptions corresponding to subsequent operations of the devices 1 are estimated from KPI management collection (information) 45 that includes information representing relationships between battery consumptions and the operations with respect to each of the plurality of devices 1. The battery lives of the devices 1 are predicted based on the estimated battery consumptions and the remaining battery powers represented by the collected status information. A circuit schedule of a maintenance engineer is determined based on the predicted battery lives, the schedule including necessity of dispatch of the maintenance engineer to the devices 1.

Note that the KPI management collection (information) 45 includes, as predefined KPI indicators, various indicators that are decision basis for determining a method of avoiding insufficient remaining battery power, a method of reducing a period during which the state is unknown owing to an operation having a risk, and a method of reducing wasteful maintenance engineer dispatch to reduce the maintenance cost. At least the battery consumption corresponding to the operation of each device 1 is included as one of the indicators.

The status information includes, for example, the system version of each device 1 at the detection time point, that is information on the degree of progress of update, and information on the remaining battery power. The energy saving device management method collects the status information from the management target devices 1, and predicts the life of each of the devices 1 with reference to the KPI indicator that includes the battery consumption corresponding to the operation.

[2] Preferably, in the energy saving device management method of [1] described above, an operation plan of reducing a period during which the remaining battery powers of the devices are insufficient is created using the operation schedule management collection (information) 46 and the circuit schedule. As described above, it is preferable to update the operation schedule management collection (information) 46 in conformity with the created operation plan, and to provide the operation plan and the circuit schedule to a terminal of the maintenance engineer.

That is, the energy saving device management method determines the necessity of dispatch of the maintenance engineer to each of the devices 1 and the schedule, based on the prediction result of the model part 49. Based on the thus determined circuit schedule and the subsequent operation plans of each of the devices, the device controller 50 determines the schedule of the operations.

[3] Preferably, in the energy saving device management method of [2] described above, it is preferable to cause a date and time of executing an operation having a relatively high risk among the subsequent operations of the devices to be close to a maintenance engineer dispatch date represented by the circuit schedule, based on risk management information representing a degree of risk of each operation. Accordingly, the operation schedule is planned such that operations in a descending order of the degree of risk are supported in a priority basis, based on the circuit schedule at opportunities of the maintenance engineer's upcoming circuit. As a result the period during which the state is unknown can be reduced.

[4] In the energy saving device management method of [3] described above, it is determined whether or not there is an operation having an execution period to which a day before the maintenance engineer dispatch date represented by the circuit schedule belongs, based on operation requirement information representing the execution period of each operation. As a result of the determination, when there is an operation having the execution period to which the day before the maintenance engineer dispatch date belongs, it is preferable to schedule an execution date of the operation to be the day before the maintenance engineer dispatch date. Accordingly, the maintenance engineer goes there the day after the execution day of the operation. Consequently, in case the execution result of the operation is inadequate, the maintenance engineer can quickly take measures. The period during which the state is unknown can therefore be reduced.

[5] In the energy saving device management method of [3] described above, it is determined whether or not there is an operation having an execution period to which the maintenance engineer dispatch date represented by the circuit schedule does not belong, based on operation requirement information representing the execution period of each operation. As a result of the determination, when there is an operation having the execution period to which the maintenance engineer dispatch date does not belong, it is preferable to schedule an execution date of the operation to be a last day in the execution period of the operation. This minimizes the number of days from the operation execution day to the day on which the maintenance engineer goes there the next time. Consequently, in case the execution result of the operation is inadequate, the number of days during which the situations in an unknown state continue can be reduced as much as possible.

[6] In the energy saving device management method of [5] described above, the achievability of the operation is determined based on the remaining battery power and the operation type. As a result of the determination, it is preferable to schedule the operation on the day before the maintenance engineer dispatch date in a case where a sufficient battery power remains even after execution of the operation. Accordingly, the maintenance engineer goes there the day after the execution day of the operation. Consequently, in case the execution result of the operation is inadequate, the maintenance engineer can quickly take measures. As a result, a well prepared system having high reliability can be constructed.

[7] In the energy saving device management method of [5] described above, the achievability of the operation is determined based on the remaining battery power and the operation type. As a result of the determination, it is preferable to schedule the operation immediately after battery replacement in a case where execution of the operation is to exhaust the remaining battery power. As described above, in the case where execution of the operation is to exhaust the remaining battery power, a failure of the operation can be substantially reliably predicted. Consequently, determination that the operation is cancelled for the device 1 having a low remaining battery power can avoid the worst-case scenario. The worst-case scenario is that the device 1 having a low remaining battery power exhausts the power of the device 1 in the middle of the operation, and the operation fails. Such a failure is sometimes eventually unsolvable only by simply performing the operation again. Accordingly, it is determined that the situations are regarded as the worst-case scenario and should be avoided. Such avoidance of the fatal failure can further improve the reliability.

The aforementioned [1] to [7] have thus been described above with reference to the drawings including FIG. 16. For example, the necessity of dispatch of the maintenance engineer to each device 1 is determined by the device controller 50 according to the presence or absence of the remaining battery power for the amount for FW update (S35). Here, if the remaining battery power is at least the amount for FW update (Yes in S35), the device controller 50 records the day before the maintenance engineer dispatch date in "time" in the FW_update_schedule 80 of the target document 78 (the document 78 having the device_id 79 coinciding with that of the selected device 1 in the FW update schedule management collection 48) (S36). As described above, the device controller 50 defines the schedule of the operations. Alternatively, based on the result of determination in step S34 in FIG. 16, an appropriate operation deadline is determined (S38).

The model part 49 collects the status information from the device 1, and refers to the KPI indicator, thereby allowing the battery life of each device 1 to be predicted. The maintenance manager 10 determines the necessity of dispatch of the maintenance engineer to the devices 1 and the circuit schedule, based on the prediction result of the model part 49. Consequently, an appropriate action guideline for the maintenance engineer can be provided, which can solve the problems described above.

The device controller 50 of the device management server 4 (FIGS. 9 and 16) stores the operation plan in the operation schedule management collection 46. The device controller 50 creates the operation plan using the risk information and the circuit schedule so as to reduce the period during which the state of the device 1 is unknown owing to the operation. The operation plan and circuit schedule created as described above can be viewed by the maintenance engineer. Accordingly, the maintenance engineer performs maintenance based thereon.

According to the energy saving device management method, the maintenance manager 10 (FIGS. 17 and 21) determines the necessity of dispatch of the maintenance engineer to the devices 1 and the schedule, based on the prediction result of the model part 49. Accordingly, insufficiency of the remaining battery power can be avoided, the period during which the state is unknown owing to an operation having a risk can be reduced, and wasteful maintenance engineer dispatch can be reduced, which can reduce the maintenance cost.

[8] Preferably, in the energy saving device management method of [2] described above, based on the past operation histories and the remaining battery power histories of the devices 1, the KPI management collection (information) 45 is updated. Accordingly, accompanied by update of the KPI management collection 45, the battery consumption and the risk information that are for the operation on each device 1 and are stored in the KPI management table are corrected, and the accuracy is improved. As a result, a maintenance system having higher reliability can be constructed.

[9] Preferably, in the energy saving device management method of [3] described above, priorities of the operations of the devices are set according to importance of an IoT solution, and an operation schedule is determined on a priority basis from the devices having high priorities. Consequently, a rational result can be obtained according to the importance of the IoT solution.

[10] The energy saving device management system 100 includes the device management server 4, the model part 49, the maintenance manager 10, and the device controller 50. The energy saving device management system 100 can achieve advantageous effects similar to those of the energy saving device management method of [1] described above. The description in further detail is as follows. The device management server 4 collects, from the management target devices 1, status information representing statuses that include remaining battery powers of the devices 1. The device management server 4 can estimate the battery consumptions corresponding to subsequent operations of the devices 1, from the KPI management collection (information) 45.

The KPI management collection (information) 45 also includes risk information representing relationships between the battery consumption and the operation with respect to each of the plurality of devices 1. The model part 49 predicts battery lives, based on the estimated battery consumptions and the remaining battery powers represented by the collected status information. The maintenance manager 10 determines necessity of dispatch of a maintenance engineer to the devices 1, and a circuit schedule, based on the predicted battery lives.

The device controller 50 identifies subsequent operations of the devices 1 from the circuit schedule, and the operation schedule management collection (information) 46. The circuit schedule is determined by the maintenance manager 10. Subsequent operations of the devices 1 are identified from the operation schedule management collection (information)

46. The subsequent operations are information representing the operation schedules of each of the plurality of the devices 1.

[11] Preferably, in the energy saving device management system 100 of [10] described above, the device management server 4 further includes the operation schedule management collection (information) 46 that stores the operation plans. Accordingly, advantageous effects similar to those of [2] described above can be achieved. That is, as shown in FIG. 9, the device controller 50 creates the operation plan using the risk information and the circuit schedule so as to reduce the period during which the state of the device is unknown owing to the operation. The operation plan and the circuit schedule created as described above are updated and recorded in the operation schedule management collection (information) 46, and are provided for the maintenance engineer in a viewable manner.

What is claimed is:

1. An energy saving device management method for improving accuracy of a management target device, comprising:
    collecting, from the management target device, status information representing status that include remaining battery power of the device;
    identifying a subsequent operation of the management target device, from operation schedule management information that is information representing schedules of operations of each of a plurality of management target devices;
    estimating battery consumptions corresponding to subsequent operations of the device, from KPI management information that includes information representing relationships between battery consumptions and the operations with respect to each of the plurality of management target devices;
    predicting battery life of the management target device, based on the estimated battery consumptions and the remaining battery power represented by the collected status information;
    determining a circuit schedule of a maintenance engineer, based on the predicted battery life, the circuit schedule including necessity of dispatch of the maintenance engineer to the management target device;
    creating an operation plan for reducing a period during which the remaining battery power of the device are insufficient, using the operation schedule management information and the circuit schedule, and updating the operation schedule management information in conformity with the operation plan;
    providing the operation plan and the circuit schedule to a terminal of the maintenance engineer;
    causing a date and time of executing an operation having a relatively high risk among the subsequent operations of the device to be close to a maintenance engineer dispatch date represented by the circuit schedule, based on risk management information representing a degree of risk of each operation;
    determining whether or not there is an operation having an execution period to which the maintenance engineer dispatch date represented by the circuit schedule does not belong, based on operation requirement information representing the execution period of each operation; and
    when there is an operation having the execution period to which the maintenance engineer dispatch date does not belong, scheduling an execution date of the operation to be a last day in the execution period of the operation.

2. The energy saving device management method according to claim 1, further comprising:
    determining whether or not there is an operation having an execution period to which a day before the maintenance engineer dispatch date represented by the circuit schedule belongs, based on the operation requirement information representing the execution period of each operation; and
    when there is an operation having the execution period to which the day before the maintenance engineer dispatch date belongs, scheduling the execution date of the operation to be the day before the maintenance engineer dispatch date.

3. The energy saving device management method according to claim 1, further comprising
    determining achievability of the operation according to the remaining battery power and an operation type, and scheduling the operation on a day before the maintenance engineer dispatch date in a case where a sufficient battery power remains even after execution of the operation.

4. The energy saving device management method according to claim 1, further comprising:
    determining achievability of the operation according to the remaining battery power and an operation type, and scheduling the operation immediately after battery replacement in a case where execution of the operation is to exhaust the remaining battery power.

5. The energy saving device management method according to claim 1, further comprising
    updating KPI management information, based on a past operation history and a remaining battery power history of the device.

6. The energy saving device management method according to claim 1, further comprising
    setting priorities of the operations of the device according to importance of an IoT solution, and determining the schedule on a priority basis from the operations having high priorities.

7. An energy saving device management system for improving accuracy of a device management server, comprising:
    the device management server capable of collecting, from a management target device, status information representing status including remaining battery power of the management target device, and of estimating battery consumptions corresponding to subsequent operations of the management target device, from KPI management information that represents relationships between battery consumptions and operations on each of a plurality of management target devices, and includes risk information;
    a model part that predicts battery life, based on the estimated battery consumptions and the remaining battery power represented by the collected status information;
    a maintenance manager that determines necessity of dispatch of a maintenance engineer to the device, and a circuit schedule, based on the predicted battery life;
    a device controller that identifies subsequent operations of the management target device, from the circuit schedule determined by the maintenance manager, and from operation schedule management information that is information representing schedules of operations of each of the plurality of management target devices; and
    an operation schedule management information that stores an operation plan created by the device controller using the risk information and the circuit schedule so as to reduce a period during which a state of the device is unknown due to the operation and updating the operation schedule management information in conformity with the operation plan, wherein the maintenance engineer is allowed to view the created operation plan and the circuit schedule, a date and time of executing an operation having a relatively high risk among the subsequent operations of the device is caused to be close to a maintenance engineer dispatch date represented by the circuit schedule, based on risk management information representing a degree of risk of each operation, determining whether or not there is an operation having an execution period to which the maintenance engineer dispatch date represented by the circuit schedule does not belong, based on operation requirement information representing the execution period of each operation, and when there is an operation having the execution period to which the maintenance engineer dispatch date does not belong, scheduling an execution date of the operation to be a last day in the execution period of the operation.

* * * * *